(12) United States Patent
Furusho et al.

(10) Patent No.: US 7,211,924 B2
(45) Date of Patent: May 1, 2007

(54) ELECTROSTATIC ATTRACTION DRIVING APPARATUS

(75) Inventors: Hidetaka Furusho, Miyagi-ken (JP); Takuya Nagai, Miyagi-ken (JP)

(73) Assignee: Alps Electric Co., Ltd., Ota-ku, Tokyo (JP)

( * ) Notice: Subject to any disclaimer, the term of this patent is extended or adjusted under 35 U.S.C. 154(b) by 85 days.

(21) Appl. No.: 11/123,802

(22) Filed: May 6, 2005

(65) Prior Publication Data

US 2005/0258709 A1 Nov. 24, 2005

(30) Foreign Application Priority Data

May 21, 2004 (JP) ............................. 2004-151180
May 21, 2004 (JP) ............................. 2004-151181
May 21, 2004 (JP) ............................. 2004-151186

(51) Int. Cl.
*H02N 1/00* (2006.01)

(52) U.S. Cl. ...................................... 310/309; 318/116

(58) Field of Classification Search ................ 310/309; 360/294.2
See application file for complete search history.

(56) References Cited

U.S. PATENT DOCUMENTS 5,869,916 A * 2/1999 Suzuki et al. ................ 310/309
5,986,381 A * 11/1999 Hoen et al. .................. 310/309
6,308,573 B1 * 10/2001 Lee et al. ....................... 73/652
6,670,738 B2 12/2003 Kasahara et al.

* cited by examiner

*Primary Examiner*—Burton Mullins
(74) *Attorney, Agent, or Firm*—Beyer Weaver LLP.

(57) ABSTRACT

A plurality of stator-side electrodes disposed in a stator is vertically disposed so as to face a plurality of mover-side electrodes disposed on a mover in a protruding manner. Wide areas facing each other can be secured between the electrodes on the stator and the mover-side electrodes even at a narrow space in three dimensions. Great electrostatic attraction force can be generated between both electrodes, and the mover 30 can be driven with greater driving force.

35 Claims, 21 Drawing Sheets

FIG. 2
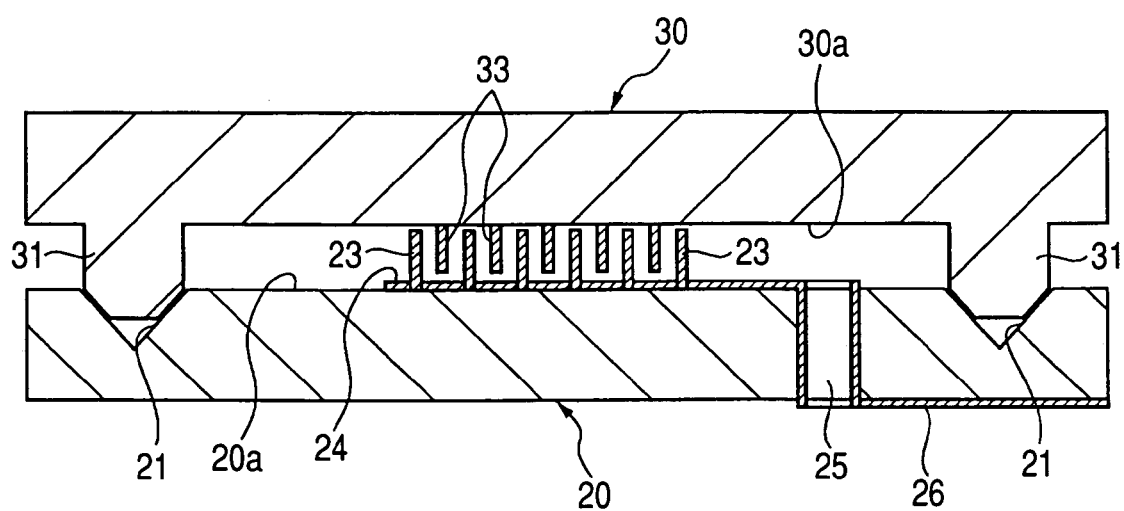
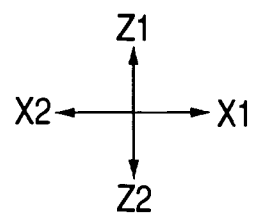

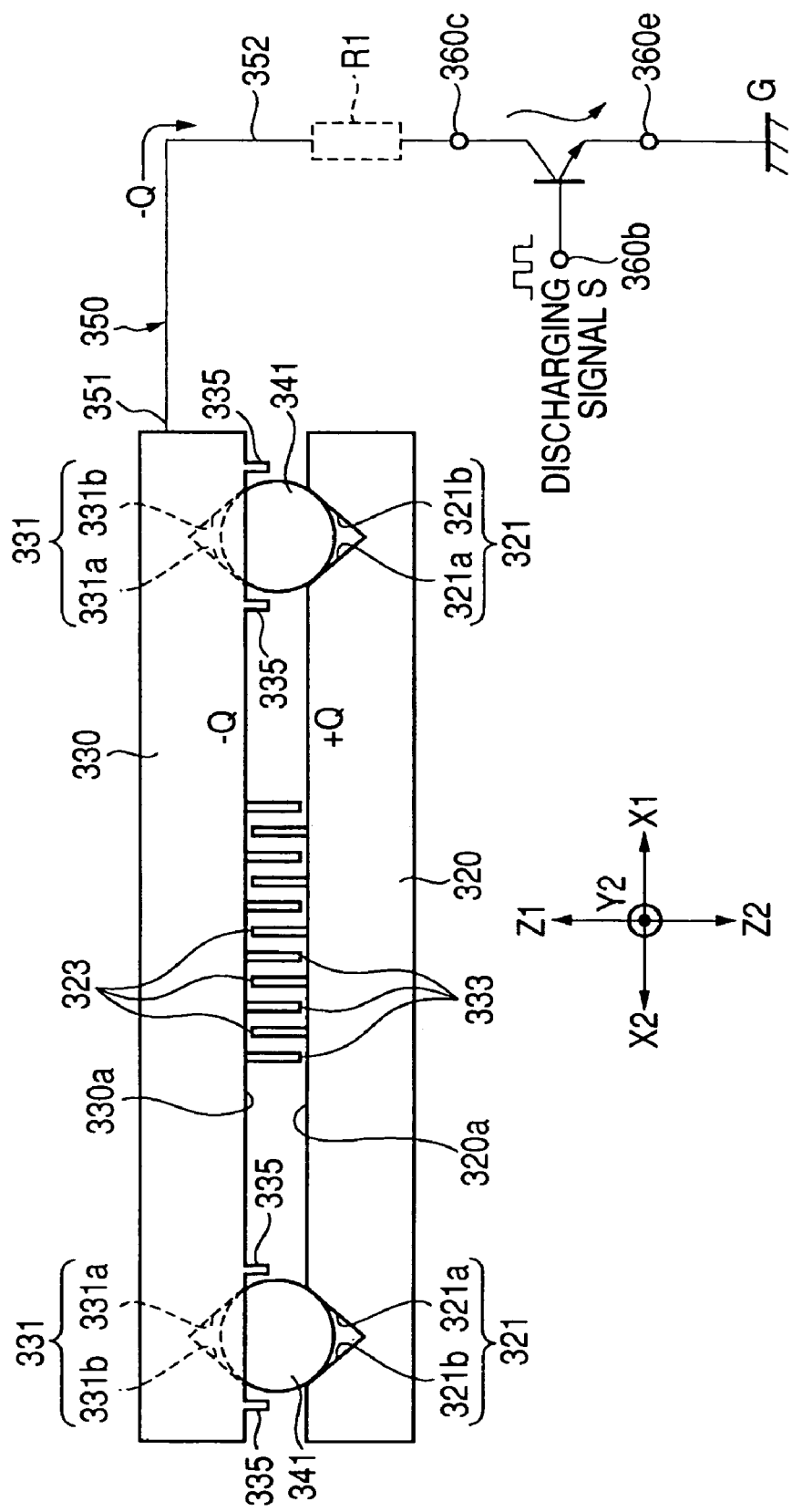

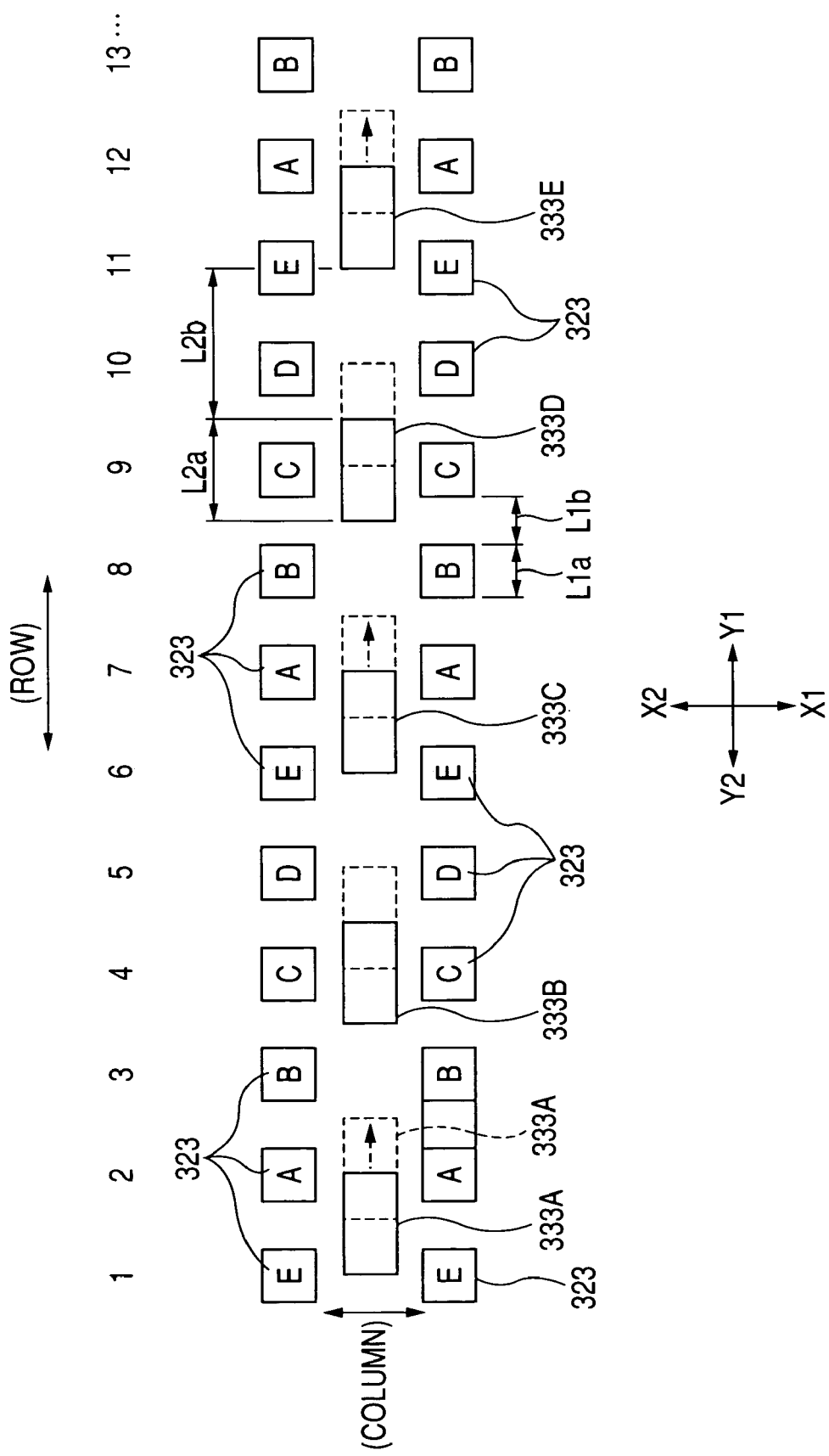

ELECTROSTATIC ATTRACTION DRIVING APPARATUS

BACKGROUND OF THE INVENTION

1. Field of the Invention

The present invention relates to an electrostatic suction driving apparatus that is driven by electrostatic force, and more particularly to an electrostatic suction driving apparatus in which higher driving force can be generated through higher electrostatic force (Coulomb force).

2. Description of the Related Art

Prior art technical documents in associate with a conventional electrostatic suction driving apparatus can include, for example, Japanese Unexamined Patent Application Publication No. 2001-346385 or the like. FIG. 10 is a view illustrating a schematic block diagram of an electrostatic suction driving apparatus as shown in FIG. 1 of Japanese Unexamined Patent Application Publication No. 2001-346385. FIG. 11 is a timing chart illustrating an electrical signal as shown in FIG. 2 of Japanese Unexamined Patent Application Publication No. 2001-346385.

In the electrostatic suction driving apparatus, a first stator 2a and a second stator 2b face each other in a state in which they are spaced apart at a predetermined distance, as shown in FIG. 10. A mover 3 for sliding to move is disposed between the first stator 2a and the second stator 2b.

Three lines of electrodes A, B and C (a firs electrode) sequentially mounted on a predetermined direction are mounted on the first stator 2a. One line of an electrode D is mounted on the second stator 2b. The mover 3 further includes electrode portions 3a respectively disposed corresponding to electrode pitches of the electrodes A, B and C on one of surfaces of the first stator 2a, and a flat electrode portion 3d facing the second stator 2b on the other surface. Both of the electrode portions 3a and 3d form one line of an electrode E (a third electrode D) which is maintained under a voltage as same as that of the portions.

As shown in FIG. 11, electrostatic force (Coulomb force) that acts between the electrodes A and the electrode E causes the mover 3 to be sucked toward the first stator 2a, when a voltage is applied to the electrodes A disposed on the first stator 2a and a voltage on the electrodes A becomes higher than that of the electrode E disposed on the mover 3. In that case, a state where the electrodes A and the electrode portions 3a exactly overlap with each other is the most stable state, whereby force to the mover 3 is applied from the electrodes A so that the electrodes A and the electrode portions 3a overlap with each other. Then, the mover 3 is sucked toward the second stator 2b, when an electrode for applying a voltage is switched to the electrode D disposed in the second stator 2b. Further, force to the mover 3 is applied by the same mechanism as that at a time when a voltage is applied to the electrodes A from the electrode B such that the electrode B and the electrode portions 3a overlap with each other, when an electrode for applying a voltage is switched to the electrode B disposed in the stator 2a. A series of those operations, i.e., a voltage is sequentially applied from a voltage source 6 to the electrodes A→the electrode D→the electrode B→the electrode D→the electrode C→the electrode D→the electrode E, . . . , through a switching circuit 5 (while a voltage is alternately applied to the electrodes A to C disposed on the first stator 2a and the electrode D disposed in the second stator 2b, and at the same time the electrodes E disposed on the first stator 2a are sequentially switched in a predetermined direction). As described above, while the mover 3 vibrates up and down microscopically, it is driven in an arranged direction (the right side in the drawing) of the electrodes mounted on the first stator macroscopically.

In case that the aforementioned electrostatic suction driving apparatus is used as a driving apparatus for moving a lens for auto focusing with it mounted in a camera or the like. It is necessary to obtain driving force to a degree for moving the lens, and to increase the moving speed, the response speed or the like. To this end, there is a need for an electrostatic suction driving apparatus capable of obtaining high driving force by generating high electrostatic force (Coulomb force).

In this case, the electrostatic force has the property that it is proportional to the square of a voltage applied and areas facing each other on electrodes, but it is inversely proportional to the square of a gap size. It is therefore possible to obtain high electrostatic force by setting these factors as an optimal value.

There is, however, a limitation to an increased application voltage due to problems caused by a battery capable of being mounted in a camera, such as breakdown voltage, . . . . There is also a limitation to a narrowed gap size due to problems caused by accuracy in machining.

Moreover, the conventional electrostatic suction driving apparatus has a structure in which surface on respective electrodes E on the first and second stators 2a and 2, and surfaces on respective electrodes on the mover 3 face each other. For this reason, in order to widen the opposite area between the electrodes, it is necessary to increase the area on each of the electrodes disposed on the first stator 2a, the second stator 2b and the mover 3 in the aspect of their surfaces. In this case, however, the electrostatic suction driving apparatus itself becomes bulky. In addition, the weight of the mover 3 increases. This results in a lowered moving speed or a slow response speed of the mover 3.

An advantage of the invention is that it provides an electrostatic suction driving apparatus which can be compact and can generate high driving force.

As another problem, electrostatic suction force generated by the electrostatic suction driving apparatus is minute, whereby it is necessary to enhance the efficiency of electrostatic suction force generated needs. To this end, it is necessary to lower friction which may be generated in sliding between the mover and the stator as less as possible.

With Regard to this point of view, in the electrostatic suction driving apparatus disclosed in Japanese Unexamined Patent Application Publication No. 2001-346385, a stopper 10 disposed on one of the stator 2a or the mover 3, and an area 8 disposed at opposite ends of the electrode E on the other one of the stator 2a or the mover 3 is designed to simply come in contact with each other to slide, as shown in FIGS. 14, 16 to 18 or the like. As described above, a part of electrostatic suction force is susceptible to loss due to friction heat or the like. This causes the driving efficiency of the mover not to be increased.

Another advantage of the invention is that it provides an electrostatic suction driving apparatus in which frictional resistance between a stator and a mover can be lowered to move the mover in a stable manner.

Moreover, in the conventional electrostatic suction driving apparatus, a static charge is generated in the first electrode on the first stator 2a when a relatively high voltage is applied to the first electrode (one of the electrodes A, B and C) on the first stator 2a, and a negative charge is thus induced in the third electrode (the electrode E) on the mover 3. In a similar manner, a static charge is generated in the second electrode of the second stator 2b when a relatively high voltage is applied to the second electrode (the electrode D) of the second stator 2b, and a negative charge is thus induced in the third electrode (the electrode E) of the mover 3.

As described above, the mover 3 is charged with a negative charge when a negative charge is kept induced in the third electrode (the electrode E) on the mover 3. Thus, in case that the mover 3 is not discharged, the movement of the mover 3 becomes slow. As described above, problems may be caused when the moving speed or the response speed is likely to be slow.

Japanese Unexamined Patent Application Publication No. 2001-346385 discloses that the electrode portions 3a disposed on one of surfaces of the mover 3 and the electrode portion 3d disposed on the other one of surface of the mover 3 are maintained as same voltages. FIG. 6 in Japanese Unexamined Patent Application Publication No. 2001-346385 shows that the electrode F disposed on the mover 3 is grounded. As described above, if all the electrode portions on the mover 3 are set as same voltages, i.e., the ground potential, the above described problems do not occur.

In Japanese Unexamined Patent Application Publication No. 2001-346385, however, in case that the mover 3 is formed of a conductor or material having a low resistance, it is likely that the first electrode on the first stator 2a and the second electrode on the second stator 2b may be shorted through the mover 3 when external force is applied to incline the mover 3. Therefore, in Japanese Unexamined Patent Application Publication No. 2001-346385, it is necessary to form the mover 3 as an insulator. For this reason, in order for the electrode portions 3a disposed on one of surfaces of the mover 3 and the electrode portion 3d disposed on the other one of surface of the mover 3 to have same voltages, dedicated pattern lines or the like for connecting the electrode portions 3a and the electrode portion 3b should be formed on the surface of the mover 3. Accordingly, a charge eliminating cable for connecting the movers 3 and the ground potential must be connected to the pattern lines, and the degree of freedom for connecting the charge eliminating cable to the mover 3 capable of being movable is likely to be limited. As a result, it is likely that the assembly of the entire device becomes difficult.

Meanwhile, the conventional electrostatic suction driving apparatus has a structure in which the mover 3 is sequentially driven in a direction in which the first electrodes mounted on the first stator 2a are arranged (a moving direction) macroscopically, while vibrating up and down microscopically.

That is, an amount of movement (displacement X) in a direction in which the mover 3 is arranged increases when the mover 3 moves upwardly in a direction in which it is sucked toward the first electrode, but decreases when the mover 3 moves downwardly in a direction in which it is sucked toward the second electrode. Therefore, the mover 3 moves upward and downward between the first stator 2a and the second stator 2b, whereby it is not smoothly driven.

Still another advantage of the invention is that it provides an electrostatic suction driving apparatus in which the degree of freedom for connection to a charge eliminating cable is increased to improve assembly of the apparatus.

Still another advantage of the invention is that it provides an electrostatic suction driving apparatus in which a mover is smoothly driven.

SUMMARY OF THE INVENTION

According to an aspect of the invention, an electrostatic suction driving apparatus includes a stator disposed to extend in a moving direction, a mover facing the stator, stator-side electrodes protruded from a facing surface on the stator facing the mover in a direction perpendicularly to the mover and aligned along the moving direction, and mover-side electrodes provided on the mover and protruded from a facing surface on the mover facing the facing surface on the stator perpendicularly to a direction of the stator and at the same time aligned along the moving direction.

Here, the electrodes on the stator and the mover-side electrodes are disposed perpendicularly to each other in the moving direction and are also disposed so as to face each other in a width direction perpendicular to a direction in which facing surface on the stator faces the facing surface on the mover, and the mover is moved in the moving direction by electrostatic suction force generated at portions where the electrodes on the stator and the mover-side electrodes face each other.

In the above, it is preferable that a plurality of the electrodes on the stator is disposed on the facing surface on the stator at predetermined intervals in the moving direction and in the width direction in a regular manner, and a plurality of the mover-side electrodes is disposed on the facing surface on the mover at locations where the mover-side electrodes do not overlap with the electrodes on the stator in a regular manner.

In the electrostatic suction driving apparatus according to the invention, a plurality of the mover-side electrodes and a plurality of the electrodes on the stator face each other in three dimensions, whereby wide areas facing each other can be secured between the electrodes E, and electrostatic suction force can be thus increased. Therefore, greater driving force can be obtained to thereby transport heavier load compared with the prior art.

For example, a plurality of electrode groups formed by electrically connecting a plurality of the electrodes on the stator aligned in the width direction are aligned parallel to each other in the moving direction with the electrode groups spaced apart, and the mover is driven as electrical signals having two or more phases are applied to the respective electrode groups.

Further, the mover is preferably grounded through a predetermined resistor, and it is more preferable that an electrical connection state between the mover and a ground potential is switched at a predetermined timing.

In the above unit, charge that can be easily charged into the mover can be discharged, whereby the mover can move quickly. That is, the moving speed or the response speed of the mover can be increased.

Furthermore, according to another aspect of the invention, an electrostatic suction driving apparatus includes a stator provided with stator-side electrodes, and a mover provided with mover-side electrodes and moving in a moving direction while facing the stator. In this case, the mover is moved by electrostatic suction force generated at portions where the electrodes on the stator and the mover-side electrodes face each other, a guiding means for guiding the mover in the moving direction is disposed between the stator and the mover.

Furthermore, according to still another aspect of the invention, an electrostatic suction driving apparatus includes a stator disposed to extend in a moving direction, a mover facing the stator, stator-side electrodes protruded from a facing surface on the stator facing the mover perpendicularly to a direction of the mover and aligned along the moving direction, and mover-side electrodes provided on the mover and protruded from a facing surface on the mover facing the facing surface on the stator perpendicularly to a direction of the stator and aligned along the moving direction. In this case, the electrodes on the stator and the mover-side electrodes are disposed perpendicularly to each other in the moving direction and also face in a width direction perpendicular to a direction in which facing surface on the stator faces the facing surface on the mover, and the mover is moved in the moving direction by electrostatic suction force generated at portions where the electrodes on the stator and the mover-side electrodes face each other, and a guiding means for guiding the mover in the moving direction is disposed between the stator and the mover.

Throughout the specification, the term "electrostatic suction" means "electrostatic attraction" in other instances as those skilled in the art would appreciate.

In the electrostatic suction driving apparatus according to the invention, sliding frication between the mover and the stator can be reduced. Therefore, the efficiency of electrostatic suction force is improved to drive the mover efficiently.

For example, the guiding means is defined with rolling bodies disposed rollably on the facing surface on one of the stator and the mover and guide grooves provided in the form of straight line on the facing surface on the other one of the stator and the mover to guide the rolling direction of the rolling bodies towards the moving direction.

Moreover, the guiding means is able to move the mover in a straight line direction, and the grooves are formed with V-shaped grooves or trapezoid grooves having a first inclined plane and a second inclined plane facing the first inclined plane at a predetermined included angle.

Further, the rolling bodies may be formed with spherical bodies or cylindrical bodies. It is also possible that first cylindrical body and a second cylindrical body as the rolling bodies are provided, and a rotating axis of the first cylindrical body and a rotating axis of the second cylindrical body are inclined with a direction of the rotating axis of the first cylindrical body maintained different from a direction of the rotating axis of the second cylindrical body.

As another construction, retaining grooves extended so as to face the guide grooves are formed on the facing surface on one of the stator and the mover, and spherical bodies are disposed rollably between the guide grooves and the retaining grooves.

In the above, wall portions extended along the moving direction are preferably formed at facing surfaces near the retaining grooves.

Furthermore, it is preferable that retaining holes in the form of square are formed on the facing surface on one of the stator and the mover, and the spherical bodies are disposed rollably in the retaining holes.

Furthermore, it is also possible that a substantially O-shaped circulating groove for connecting a pair of parallel grooves having respective depths different from each other to be extended parallel to each other along the moving direction to opposite ends of the parallel grooves, and a plurality of spherical bodies for freely moving in the circulating groove are formed on facing surface on the mover, guide grooves facing a groove having a relatively shallow depth among a pair of the parallel grooves are formed in the stator along the moving direction.

Furthermore, the electrostatic suction driving apparatus further includes a guide groove on the stator having its surface covered with a conductive film; a retaining groove having its surface covered with a conductive film on the mover; a conductive spherical body for rolling freely between the guide groove and the retaining groove; a resistor connected to the conductive film on the stator; and a charge eliminating means having a switch element to switch the resistor and a ground from a conductive state to a non-conductive state or from a non-conductive state to a conductive state in response to a predetermined signal.

In the above means, charge charged into the mover can be discharged, whereby the moving speed or the response speed of the mover can be increased.

Furthermore, according to the invention, in an electrostatic suction driving apparatus which includes a stator provided with stator-side electrodes, a mover provided with mover-side electrodes and supported movably in a moving direction with the mover face the stator, and a signal source for applying a predetermined voltage signal to the electrodes on the stator, the mover being moved by electrostatic suction force generated at portions where the electrodes on the stator and the mover-side electrodes face each other, the mover is formed with a conductor or material having a low resistance.

It is possible that the mover is formed of silicon having a low resistance, or both the mover-side electrodes and the mover are formed of resin having material with a low resistance mixed with a conductive resin.

In the invention, the entire mover can be formed with the conductor or the material having a low resistance, whereby the charge eliminating cable can be connected to a predetermined location on the mover. Therefore, the degree of freedom for wiring the charge eliminating cable can be increased without limiting the movement of the mover. Consequently, the entire apparatus can be easily assembled.

A resistance value in the mover preferably ranges from 1 $\Omega$ to 1 k$\Omega$. In the means, the response of the mover can be improved, while insulation breakage and breakdown voltage of the mover are maintained to a certain degree.

Furthermore, the mover-side electrodes and the electrodes on the stator are preferably protruded vertically from the facing surface on one of the stator and the mover towards the facing surface on the other one of the stator and the mover, at the same time are provided with a pair of relatively long side portions parallel to the moving direction and a relatively short side portions provided at opposite ends in the moving direction, and are formed with a curved surface that is convex in the moving direction.

In the means, abrupt change in electrostatic suction force can be prevented so that the mover can be smoothly driven.

A charge eliminating means is preferably disposed between the mover and a ground potential.

In the charge eliminating means, the mover can be surely discharged so that it is possible to prevent the moving speed or the response speed of the mover from lowering.

BRIEF DESCRIPTION OF THE DRAWINGS

FIG. 2 is a cross-sectional view taken along line II—II of FIG. 1 in which a state where a stator and a mover face each other is shown;

FIG. 22 is a cross-sectional view taken along line III—III of FIG. 20, which shows a state where a stator and a mover are assembled so as to face each other;

FIG. 24 is a partial plan view illustrating the arrangement in the electrodes on the stator and the mover-side electrodes.

DESCRIPTION OF THE PREFERRED EMBODIMENT

Preferred embodiments of the invention will now be described with reference to the drawings.

Figure 1:
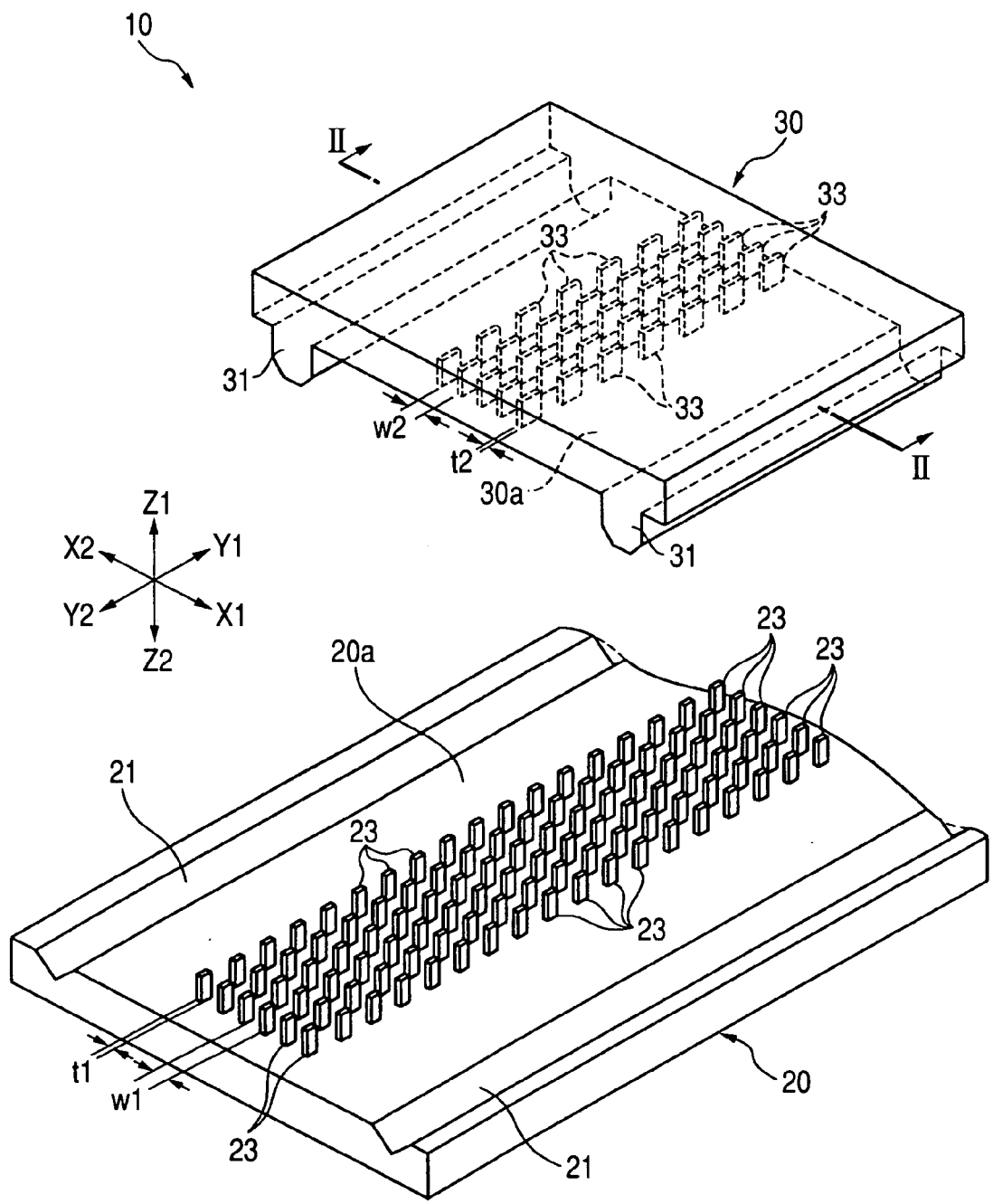
FIG. 1 is an exploded perspective view illustrating an electrostatic suction driving apparatus according to an embodiment of the invention.
Figure 3:
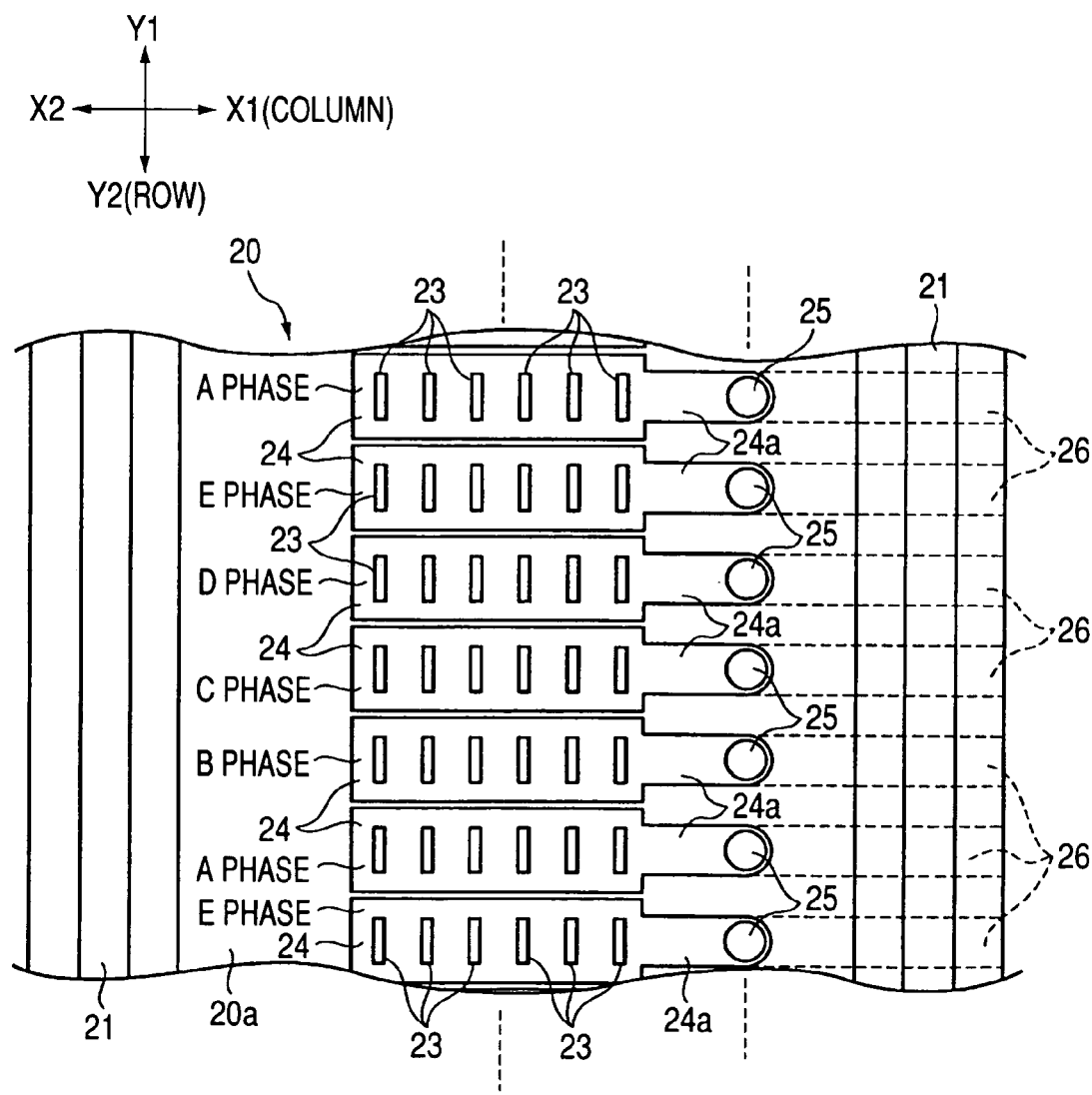
FIG. 3 is a partial plan view illustrating the construction of a stator according to a first embodiment.
Figure 4:
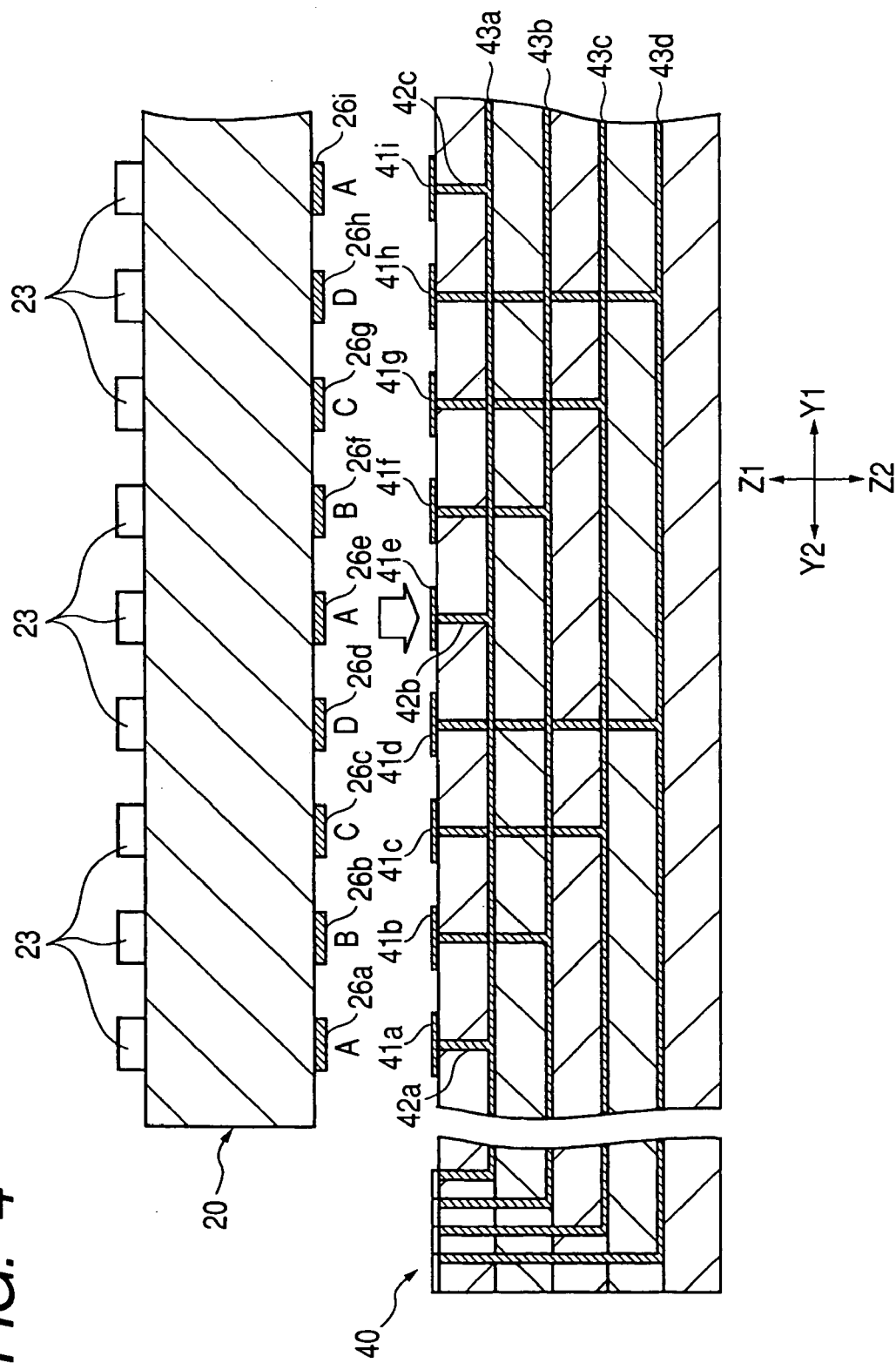
FIG. 4 is a cross-sectional view illustrating the construction of a substrate in which a stator and a stator are mounted.

FIG. 1 is an exploded perspective view illustrating an electrostatic suction driving apparatus according to an embodiment of the invention. FIG. 2 shows a state where a stator and a mover face each other, and is a cross-sectional view taken along line II—II of FIG. 1. FIG. 3 is a partial plan view showing the structure of a stator as a first embodiment. FIG. 4 is a cross-sectional view illustrating the structure of a substrate in which a stator and a stator are mounted. In addition, hereinafter, an Y1 direction indicates a moving direction, an X direction indicates a width direction, and a Z direction indicates a height direction.

As shown in FIG. 1, the electrostatic suction driving apparatus 10 according to the invention includes a stator 20 disposed on a Z2 side of a height direction, and a mover 30 disposed on a Z1 side thereof.

The stator 20 is disposed to extend in a Y direction being a moving direction, and is a flat panel-shaped member. The stator 20 can be formed of an insulating material such as, for example, silicon. A pair of V-shaped guide grooves 21 and 21 extended along the moving direction (the Y direction) in a manner parallel to each other is disposed at opposite ends in the width direction (the X direction) on a facing surface 20a (a facing surface on the stator) (the Z1 side) of the stator 20. Surfaces on each of the guide grooves 21 and 21 are provided with a smooth plane having low frictional resistance.

Meanwhile, the length of the mover 30 in the moving direction Y is shorter than that of the stator 20. The mover 30 is formed of a conductive material. A conductive flat plane or the like can be mounted on one of surfaces of the mover 30 which is formed of an insulating material such as silicon to form a facing surface 30a (a facing surface on the mover).

A pair of guide convex parts 31 and 31, extended along the moving direction (the Y direction) parallel to each other, is disposed at opposite ends in the width direction (the X direction) on the facing surface 30a (the Z2 side) on the mover 30. A surface of each of the guide convex parts 31 and 31 also has a smooth plane having low frictional resistance.

As shown in FIG. 2, if the facing surface 20a on the stator 20 and the facing surface 30a on the mover 30 face each other, the guide convex parts 31 and 31 are inserted into the guide grooves 21 and 21 so that the electrostatic suction driving apparatus 10 is assembled. In this state, the mover 30 can move in the Y direction (the moving direction) in a straight manner, when force is applied to the mover 30 in the moving direction. In other words, in the present embodiment, the guide grooves 21 and 21, and the guide convex parts 31 and 31 serve as guiding means for guiding the mover 30 in the moving direction.

As shown in FIG. 1, on the facing surface 20a on the stator 20 is formed a plurality of stator-side electrodes 23, which are in the form of a flat plane. A conductive metal such as copper is plated vertically in the Z direction to grow so that the electrodes on the stator 23 are formed. The direction of the electrodes on the stator 23 is disposed such that the direction of a relatively wide side on an electrode plane is parallel to the moving direction Y, i.e., the electrode plane is vertical to the width direction. Further, a plurality of the electrodes on the stator 23 is aligned on the facing surface 20a along the moving direction and the width direction in a regular manner with them spaced apart equally.

In an embodiment shown in FIG. 3, an stator-side electrodes 23 which are formed with 6 columns in the X direction (the width direction) and with N rows in the Y direction (the moving direction) with them sapced apart at a predetermined distance. It is, however, to be noted that the arrangement in the electrodes on the stator 23 is not limited to the aforementioned N row and 6 columns, but can have greater or smaller rows and columns.

FIG. 3 shows a first embodiment. A plurality of conductive parts 24 extended in the X direction is formed with N rows on the facing surface 20a on the stator 20, i.e., on a base part of the electrodes on the stator 23 in the Y direction. Each of the conductive parts 24 is formed with electrode groups to which are electrically connected such that six (6 columns) stator-side electrodes 23 per one row can have same voltages. However, the conductive parts 24 that are adjacent in the moving direction (Y) are cut out to provide electrical insulation among the electrode groups. Furthermore, each of the electrode groups on the conductive parts 24 is drawn out the stator 20, and is designed to apply a voltage to each of the electrode groups.

As a method of drawing out the conductive parts 24, as shown in FIGS. 2 and 3, through holes 25 that are penetrated along a height direction are formed with N rows in the stator 20 in the Y direction. The conductive parts 24a extended from the respective conductive parts 24 through the through holes 25 can be drawn to the bottom (the plane of the Z2 side) of the stator 20. In this case, the respective conductive parts 24 can be drawn outside the stator 20 through a plurality of conductive pads 26a, 26b, . . . , (see FIG. 4), which are formed corresponding to the bottom of the stator 20 on a row basis.

Furthermore, as shown in FIG. 4, a substrate 40 with multi layers, which serves to fix the stator 20, is preferably formed under the stator 20. On the substrate 40 is formed a plurality of conductive connection pads 41a and 41b corresponding to the conductive pads 26a, 26b, . . . . Accordingly, the stator 20 is pushed toward the substrate 40 and then the conductive pads 26a, 26b, . . . are pressed to the connection pads 41a, 41b, . . . or a conductive adhesive is applied on the conductive pads 26a, 26a, . . . and the connection pads 41a, 41b, . . . so that it is easy to electrically connect the respective conductive pads 26a, 26b, . . . and the respective connection pads 41a, 41b, . . . .

In the substrate 40 are formed a plurality of through holes 42 extended in a thickness (Z) direction of the plate, a plurality of conductive layers 43 extended in a moving direction, and the like. The connection pads 41a, 41b, . . . can be interconnected through the through holes 42 and the conductive layers 43. For example, in the embodiment shown in FIG. 4, the connection pads 41a, 41e and 41i are interconnected through the through holes 42a, 42b and 42c, and the conductive layer 43a. In the same manner, the connection pad 41b and the connection pads 41f are interconnected, the connection pad 41c and the connection pad 41g are interconnected, and the connection pad 41d and the connection pad 41h are interconnected. Accordingly, for example, in the stator 20, one electrode group that can be connected to the conductive pad 26a, one electrode group that can be connected to the conductive pad 26e, and one electrode group that can be connected to the conductive pad 26i can be electrically interconnected. The electrode groups can be treated as one group (for example, an A phase electrode group).

In a similar manner, one electrode group connected to the conductive pad 26b and one electrode group connected to the conductive pad 26f can be defined as, for example, a B phase electrode group, one electrode group connected to the conductive pad 26c and one electrode group connected to the conductive pad 26g may be defined as, for example, a C phase electrode group, and one electrode group connected to the conductive pad 26d and one electrode group connected to the conductive pad 26h may be defined as, for example, a D phase electrode group.

In the meantime, as shown FIG. 1, the mover-side electrodes 33 in the form of the flat plane are disposed on the facing surface 30a (the mover-side electrode side) on the mover 30. The mover-side electrodes 33 can be formed by plating and growing a conductive metal, such as copper, in a direction vertical to the Z direction in a similar manner as in the stator 20. In a state where the direction of a relatively wide side on an electrode plane is parallel to the moving direction Y, the mover-side electrodes 33 are aligned along the moving direction and the width direction in a regular manner with them space apart equally. In addition, in the embodiment shown in FIG. 1, the mover-side electrodes 33 are formed with 7 rows and 5 columns on the facing surface 30a on the mover 30.

Furtherm, as shown in FIG. 1, an electrode gap W1 in the width direction between the electrodes on the stator 23 is greater than a thickness t2 in the width direction between the mover-side electrodes 33. In the same manner, an electrode gap W2 in the width direction between the mover-side electrodes 33 is greater than a thickness t1 in the width direction between the electrodes on the stator 23. Therefore, the mover-side electrodes 33 can be inserted between the electrodes on the stator 23 and the electrodes on the stator 23, which are adjacent to each other in the width direction. The electrode plane on the electrodes on the stator 23 and the electrode plane on the mover-side electrodes 33 face each other.

Further, as shown in FIG. 2, the height of the Z direction of the electrodes on the stator 23 and the mover-side electrodes 33 is set as a degree that front ends of the electrodes on the stator 23 and the mover-side electrodes 33 do not come in contact with the surface of the facing surface 20a and the surface of the facing surface 30a with the stator 20 and the mover 30 put together.

In the state shown in FIG. 2, the electrode plane on the electrodes of the stator 23 and the electrode plane on the mover-side electrodes 33 face so as to be parallel to each other. Therefore, a capacitor is formed at each portion where the electrode plane on the electrodes of the stator 23 and the electrode plane on the mover-side electrodes 33 face each other, when an electric potential difference is generated between the electrodes on the stator 23 and the mover-side electrodes 33.

Moreover, in the electrostatic suction driving apparatus according to the present embodiment, a plurality of the electrodes on the stator 23 and a plurality of the mover-side electrodes 33 face each other in three dimensions. Thus, the opposite areas between the electrodes on the stator 23 and the mover-side electrodes 33, which form the capacitor, are designed to be expanded greater than the prior art. Accordingly, as will be described below, great electrostatic suction force can be generated so that it is possible to drive the mover 30 with great driving force.

Figure 5:
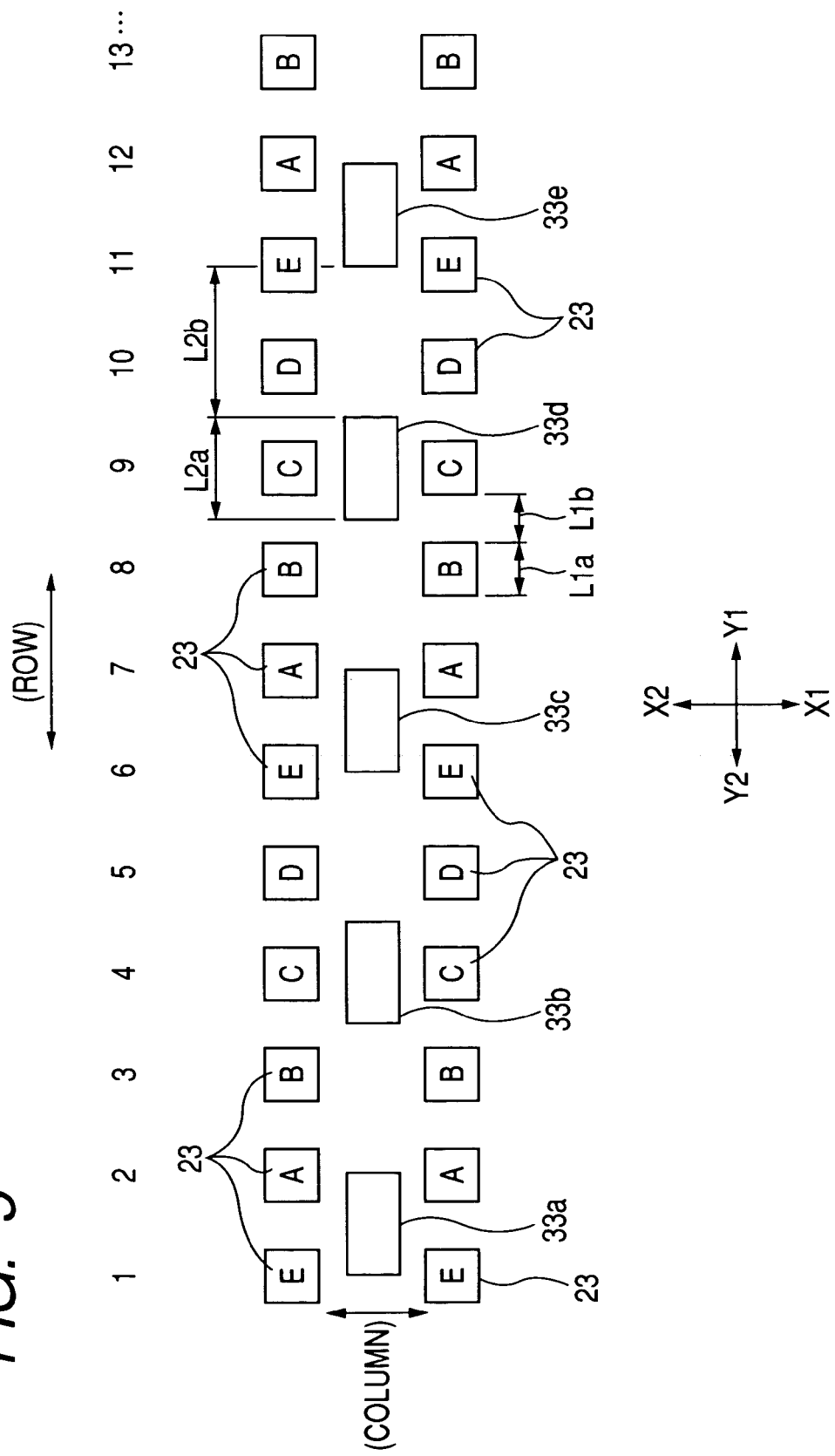
FIG. 5 is a partial plan view showing the arrangement in stator-side electrodes mover-side electrodes.
Figure 6:
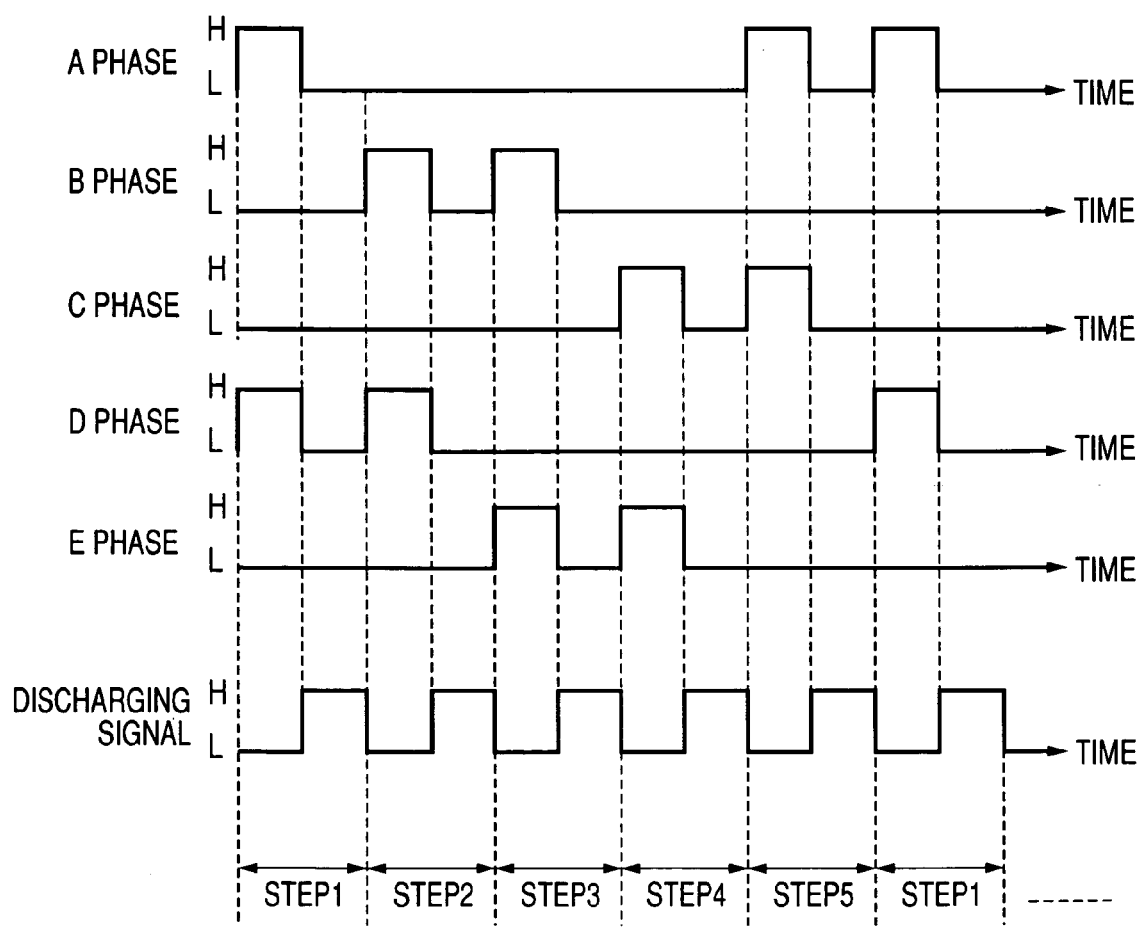
FIG. 6 is a timing chart showing an example of electrical signals applied to the electrostatic suction driving apparatus shown in FIG. 5.
Figure 7:
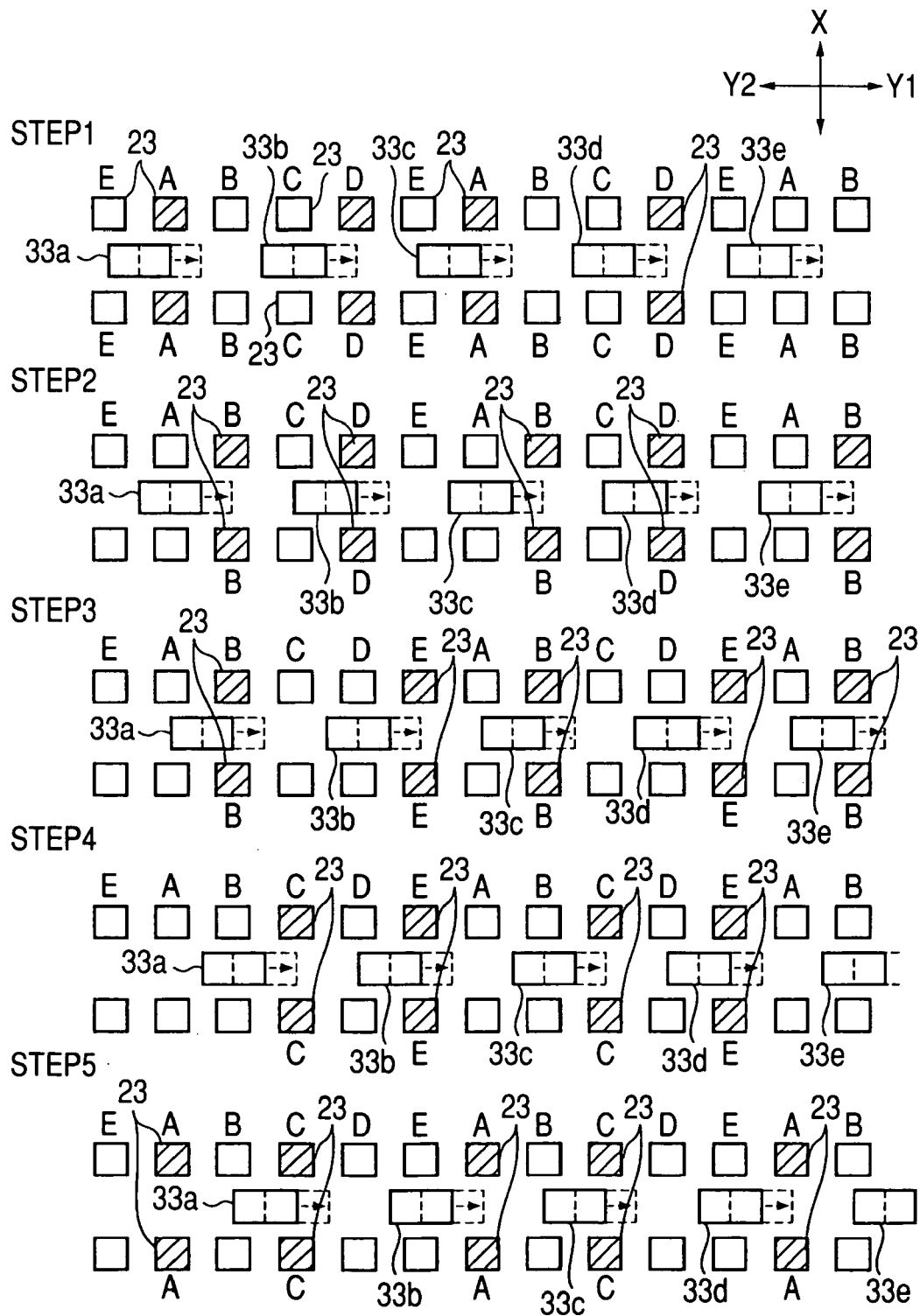
FIG. 7 is a plan view for explaining the operation of the electrostatic suction driving apparatus in respective steps as shown in FIG. 4.

FIG. 5 is a partial plan view illustrating arrangement in stator-side electrodes and mover-side electrodes. There is shown in FIG. 5 that columns of the mover-side electrodes 33 faces each other between the electrodes on the stator 23 and 23, which are formed with tow columns in the moving direction (the Y direction). FIG. 6 is a timing chart showing an example of an electrical signal applied to the electrostatic suction driving apparatus shown in FIG. 5. FIG. 7 is a plan view illustrating operations of the electrostatic suction driving apparatus in respective steps as shown in FIG. 4. STEP 1 indicates a state where a voltage is applied to the A phase electrode group and the D phase electrode group. STEP 2 indicates a state where a voltage is applied to the B phase electrode group and the D phase electrode group. STEP 3 indicates a state where a voltage is applied to the B phase electrode group and the E phase electrode group. STEP 4 indicates a state where a voltage is applied to the C phase electrode group and the E phase electrode group. STEP 5 indicates a state where a voltage is applied to the A phase electrode group and the C phase electrode group. In FIGS. 5 and 7, the electrodes on the stator 23 for forming the electrode groups from the A phase to the E phase are designated by symbols A to E. Reference numerals attached in the moving direction indicate row numbers such as a first row number and a second row number. Further, in STEP 1 to STEP 5 of FIG. 7, the electrodes on the stator 23, which form the electrode groups to which a voltage is applied, are indicated by a hatched part.

As shown in FIG. 5, the arrangement in a moving direction (a Y direction) is set as a row and the arrangement in a width direction (a X direction) is set as a column, the electrodes on the stator 23 at a first row, a sixth row, an eleventh row, ..., a $(5n-4)^{th}$ row in the Y2 direction are defined as a E phase electrode group, the electrodes on the stator 23 at a second row, a seventh row, a twelfth row, ..., a $(5n-3)^{th}$ row are defined as an A phase electrode group, the electrodes on the stator 23 at a third row, an eighth row, a thirteenth row, ..., a $(5n-2)^{th}$ row are defined as the B phase electrode group, the electrodes on the stator 23 at a fourth row, a ninth row, a fourteenth row, ..., a $(5n-1)^{th}$ row are defined as the C phase electrode group, and the electrodes on the stator 23 of a fifth row, a tenth row, a fifteenth row, ..., a $5n^{th}$ row are defined as the D phase electrode group. Furthermore, although all of the mover-side electrodes 33 are electrically interconnected in the mover 30, the mover-side electrode 23a, the mover-side electrode 23b, the mover electrode 33c, the mover-side electrode 23d, ... are sequentially arranged from the Y2 side for explanation's convenience.

Moreover, as shown in FIG. 5, the length of the electrodes on the stator 23 is set as L1a, the distance between the electrodes on the stator 23 that are adjacent to each other in the moving direction as L1b, the length of the mover-side electrodes 33 as L2a, and the distance between the mover-side electrodes 33 adjacent to each other in the moving direction as L2b, the relation between the electrodes on the stator 23 and the mover-side electrodes 33 as L1a<L2a respectively. In any one of the moving directions, the electrode plane on the stator-side electrode 23 and the electrode plane on the mover-side electrode 23 correspond to each other, thereby forming a capacitor between the opposite electrodes.

Furthermore, phases (driving phase), such as L1a setting as the length of the electrodes on the stator 23, L1b as the distance between the electrodes on the stator 23 in the moving direction, L2a as the length of the mover-side electrodes 33, and L2b as the distance between the electrodes E in the moving direction, and the A phase electrode group, the B phase electrode group, ..., and the like are formed to establish the following equation 1.

$$\text{driving constant} = 2 \times \frac{(L2a + L2b)}{(L1a + L1b)} \quad \text{[Equation 1]}$$

A predetermined electrical signal as shown in FIG. 6 is applied to the five A phase electrode group, B phase electrode group, C phase electrode group, D phase electrode group and E phase electrode group are applied. That is, in STEP 1, the electrical signal is applied to the A phase electrode group and the D phase electrode group. In STEP 2, the electrical signal is applied to the B phase electrode group and the D phase electrode group. In STEP 3, the electrical signal is applied to the B phase electrode group and the E phase electrode group. In STEP 4, the electrical signal is applied to the C phase electrode group and the E phase electrode group. In STEP 5, the electrical signal is applied to the A phase electrode group and the C phase electrode group. Those STEPs are repeated through order of STEP 1→STEP 2→STEP 3→STEP 4→STEP 5→STEP 1→STEP 2→ . . . .

In that case, it was assumed that the electrostatic suction driving apparatus 10 was in an initial state as shown in STEP 1 of FIG. 7 (as same as in FIG. 5), i.e., a state where the mover-side electrode 23a, 33c and 33e face each other in a state where they are partially overlapped between the electrodes on the stator 23 for forming the E phase electrode group and the electrodes on the stator 23 for forming the A phase electrode group, and the mover-side electrode 23b and 33d face only the electrodes on the stator 23 that form the C phase electrode group.

In this initial state, the electrodes on the stator 23 for forming the A phase electrode group located at the second row and the mover-side electrode 23a face each other in a state where they are partially overlapped to generate electrostatic suction force (Coulomb force) therebetween, when a predetermined voltage is applied to the A phase electrode group and the D phase electrode group at the same time as shown in STEP 1. Thus, the mover-side electrode 23a is sucked toward the electrodes on the stator 23 (at the second row) that form the A phase electrode group. However, the electrodes on the stator 23 and 23 that form the A phase electrode group are disposed at opposite ends in the width direction of the mover-side electrode 23a so that component acting in the width (X) direction of electrostatic suction force are offset each other. Meanwhile, the mover-side electrode 23a moves in the Y1 direction, since component in the moving (Y) direction of the electrostatic suction force remain.

In this case, a state where the center of the mover-side electrode 23a in the moving direction coincides with the center of the electrodes on the stator 23 in the moving direction which forms the A phase electrode group is the most stable state, whereby the mover-side electrode 23a moves up to a location indicated by dotted line in STEP 1 of FIG. 7. This relationship is maintained same in the mover electrode 33c and the A phase electrode group at the seventh row, and the mover-side electrode 23e and the A phase electrode group at the twelfth row. Accordingly, the mover 30 is moved in the Y1 direction by electrostatic suction force that acts on the mover-side electrodes 33a, 33c and 33e.

In addition, in STEP 1, electrostatic suction force (Coulomb force) does not acts between the mover-side electrodes 33b and 33d, and the C phase electrode group, since a voltage is not applied to the electrodes on the stator 23 that faces the mover-side electrodes 33b and 33d and that the C phase electrode group is formed.

Next, in STEP 2, a voltage is applied to the B phase electrode group and the D phase electrode group at the same time. As shown in STEP 2 of FIG. 7, the electrodes on the stator 23 and 23 that form the D phase electrode group and the mover-side electrodes 33b and 33d face each other in a state where they are partially overlapped, no mover-side electrodes face the electrodes on the stator 23 and 23 that form the B phase electrode group. Thus, in the same manner as in STEP 1, in the mover 30, the mover-side electrodes 33b and 33d move up to a location indicated by dotted line in STEP 2 of FIG. 7, i.e., a location where the mover-side electrodes 33b and 33d face the electrodes on the stator 23 that form the D phase electrode group into a stabilized state.

As shown in FIG. 6, in STEP 3, a voltage is applied to the B phase electrode group and the E phase electrode group at the same time. In STEP 3 of FIG. 7, the electrodes on the stator 23 and 23 that form the B phase electrode group, and the mover-side electrodes 33a, 33c and 33e face each other in a state where they are partially overlapped, and no mover-side electrodes face the electrodes on the stator 23 that form the E phase electrode group. Accordingly, in the same manner as described above, in the mover 30, the mover-side electrodes 33a, 33c and 33e move up to a location indicated by dotted line in STEP 3 of FIG. 7, i.e., a location where the mover-side electrodes 33a, 33c and 33e face the electrodes on the stator 23 that form the B phase electrode group into a stabilized state.

In a similar manner, in STEP 4 of FIG. 7, a voltage is applied to the C phase electrode group and the E phase electrode group at the same time, whereby the mover-side electrodes 33b and 33d on the mover 30 move from a location indicated by solid line up to a location indicated by dotted line in STEP 4 of FIG. 7. Further, in STEP 5 of FIG. 7, a voltage is applied to the A phase electrode group and the C phase electrode group at the same time, whereby the mover-side electrodes 33a, 33c and 33e on the mover 30 move from a location indicated by solid line up to a location indicated by dotted line in STEP 5 of FIG. 7.

As described above, electrical signals accompanied by STEPs 1 to 5 of FIG. 6 are applied to the respective electrode groups of the electrodes on the stator 23 so that the mover 30 can move in the Y1 direction by a distance (L2a+L2b) corresponding to one section of the mover-side electrodes extended in the moving direction. It is also possible to move the mover 30 in the moving direction (the Y1 direction) in a sequential manner by sequentially repeating a series of operations from STEP 1 to STEP 5.

Moreover, on the basis of the same principle, for example, in a manner such as STEP 5→STEP 4→STEP 3→STEP 2→STEP 1→STEP 5, when a series of the operations are repeated reversely, the mover 30 can move in a direction (the Y2 direction) opposite to the moving direction (the Y1 direction) in a sequential manner.

In the above, it is preferable that the mover 30 be discharged, whenever a voltage of a high (H) level is applied in each STEP as shown in FIG. 6. That is, a static charge is generated in the electrodes on the stator 23, when a voltage under a high level is applied to the electrodes on the stator 23. Thus, a negative charge is induced in the mover-side electrodes 33, whereby a capacitor is formed between the electrodes on the stator 23 and the mover-side electrodes 33. However, the mover-side electrodes 33 are maintaining in a state charged with a negative charge although only the electrodes on the stator 23 are set as a low level. Therefore, the movement of the mover 30 becomes slow when the mover 30 is not discharged. This may result in lowered moving speed or slow response speed.

In order to solve this problem, it is preferable that the mover 30 be grounded to a ground potential so that a charged charge is discharged into the ground (ground potential). If the mover 30 is maintained in a grounded state, a negative charge necessary for the mover-side electrodes 33 is not susceptible to being induced. This may result in decrease in electrostatic suction force.

It is thus preferable that a discharge signal as shown in FIG. 6 be used to discharge the mover 30 at timing in which a voltage of an electrical signal is switched from a high level to a low level in each of the STEPs. A switching element such as a transistor is used to perform the discharge operation. Further, an electrical charge charged in the mover 30 is discharged into the ground (the ground potential) through a predetermined amount of a resistor. In addition, a resistance value can be determined by a relationship between a time constant RC formed by a multiplying capacitance of a capacitor X by a resistance value and a time period under a low level. The resistance value is preferably set as a value in which the charged charge can be sufficiently discharged for a time period under a low level.

Further, a case where a five-phase electrical signal is used to drive electrostatic suction driving apparatus 10 has been described in the above. It is, however, to be noted that the invention is not limited thereto, but an electrical signal having 2 or more phases, such as 3 phases and 7 phases can be used to drive the electrostatic suction driving apparatus 10.

In addition, as described above, if the conductive part 24 is formed on the facing surface 20a on the stator 20, the conductive part 24 of the stator 20 and the facing surface 30a on the mover 30 face each other. The facing surface 30a is formed of a conductive material so that electrostatic suction force in the Z direction can be generated even between the stator 20 and the mover 30. Accordingly, the mover 30 is sucked toward a direction in which the mover 30 approaches the stator 20 to thereby prevent the mover 30 in the Z direction from being rocked. Further, an opposite areas over a predetermined size can be obtained between the electrodes on the stator 23 and the mover-side electrodes 33, whereby electrostatic suction force in the width direction can be prevented from lowering.

Electrostatic suction force (Coulomb force) in case of the electrostatic suction driving apparatus 10 will now be described.

An opposite areas in which the electrode plane on the electrodes on the stator 23 and the electrode plane on the mover-side electrodes 33 face each other in the width direction are set as S, dielectric constant between the electrodes E as $\in$, an initial distance between the electrodes E as d, and an electric potential difference (a voltage applied) between electrodes as V respectively.

It is also assumed that electrostatic force f(x) acts between the electrodes on the stator 23 and the mover-side electrodes 33 to move the mover-side electrodes 33 in the width direction (X1 or X2 direction) by displacement magnitude x, and thus approach the electrodes on the stator 23.

In this case, that is, capacitance C between the electrodes on the stator 23 and the mover-side electrodes 33 after the mover-side electrodes 33 approach the electrodes on the stator 23 can be expressed as a following equation 2.

$$C = \varepsilon \frac{S}{d-x} \qquad \text{[Equation 2]}$$

Furthermore, in this case, electrostatic energy U in a capacitor can be expressed as a following equation 3.

$$U = \frac{1}{2}CV^2 = \frac{1}{2}\frac{\varepsilon S}{d-x}V^2 \qquad \text{[Equation 3]}$$

Therefore, electrostatic force f(x), which acts when the mover-side electrodes 33 move by displacement magnitude x under the condition in which the voltage difference V is constant, can be expressed as a following equation 4.

$$f(x) = \frac{\partial U}{\partial x} = \frac{\partial}{\partial x}\left(\frac{1}{2}\frac{\varepsilon S}{d-x}V^2\right) = \frac{1}{2}\frac{\varepsilon S}{(d-x)^2}V^2 \quad [\text{Equation 4}]$$

The electrostatic force f(x) in Equation 4 acts on respective portions where the electrodes on the stator 23 and the mover-side electrodes 33 face each other. As shown in FIGS. 1 and 2, in case of the present embodiment having the mover-side electrodes 33 formed with five columns and the electrodes on the stator 23 formed with six columns, the electrostatic force f(x) at each one of the rows is equal to totally ten opposite portions since the ten opposite portions are located at each one of the rows. Thus, when the number of opposite portions is set as m, the electrostatic force F(x) can be expressed as a following equation 5.

$$F(x) = m \cdot f(x) = m \cdot \frac{1}{2}\frac{\varepsilon S}{(d-x)^2}V^2 \quad [\text{Equation 5}]$$

Furthermore, same kinds of electrode groups are mounted on one row at a predetermined pitch. Therefore, for example, ten rows of electrode groups that form electrode groups of each phase face a mover 30 in order of A to D. In this case, assuming that the first row is the A phase electrode group, the fourth row and eight row are the A phase electrode groups. Further, if a voltage is applied to all of the A phase electrode groups at the same time, electrostatic force F(x) is generated in the electrodes on the stator 23 that form the first, fourth and eighth rows of the A phase electrode group. In a similar manner, if a voltage is applied to all of the B phase electrode groups, electrostatic force F(x) is generated in the electrodes on the stator 23 that form the second, fifth and ninth rows of the B phase electrode group. Accordingly, assuming that the number of rows in the electrode groups of a same kind of the stator, which can face a mover 30, is set as n, the total electrostatic force ΣF(x) generated in the electrostatic suction driving apparatus 10 can be expressed as a following equation 6.

$$\Sigma F(x) = m \cdot n \cdot F(x) = m \cdot n \cdot \frac{1}{2}\frac{\varepsilon S}{(d-x)^2}V^2 \quad [\text{Equation 6}]$$

That is, it is possible to convey load heavier than that in the prior art, since the mover 30 can apply greater driving force compared with the prior art. In addition, the electrodes on the mover and the stator are oriented in a vertical direction, whereby the opposite areas on the electrodes can be oriented in a height direction. Accordingly, great driving force can be obtained, since a relatively big opposite areas can be obtained even at a narrow space. It is thus possible to have a compact electrostatic suction driving apparatus 10.

Figure 8:
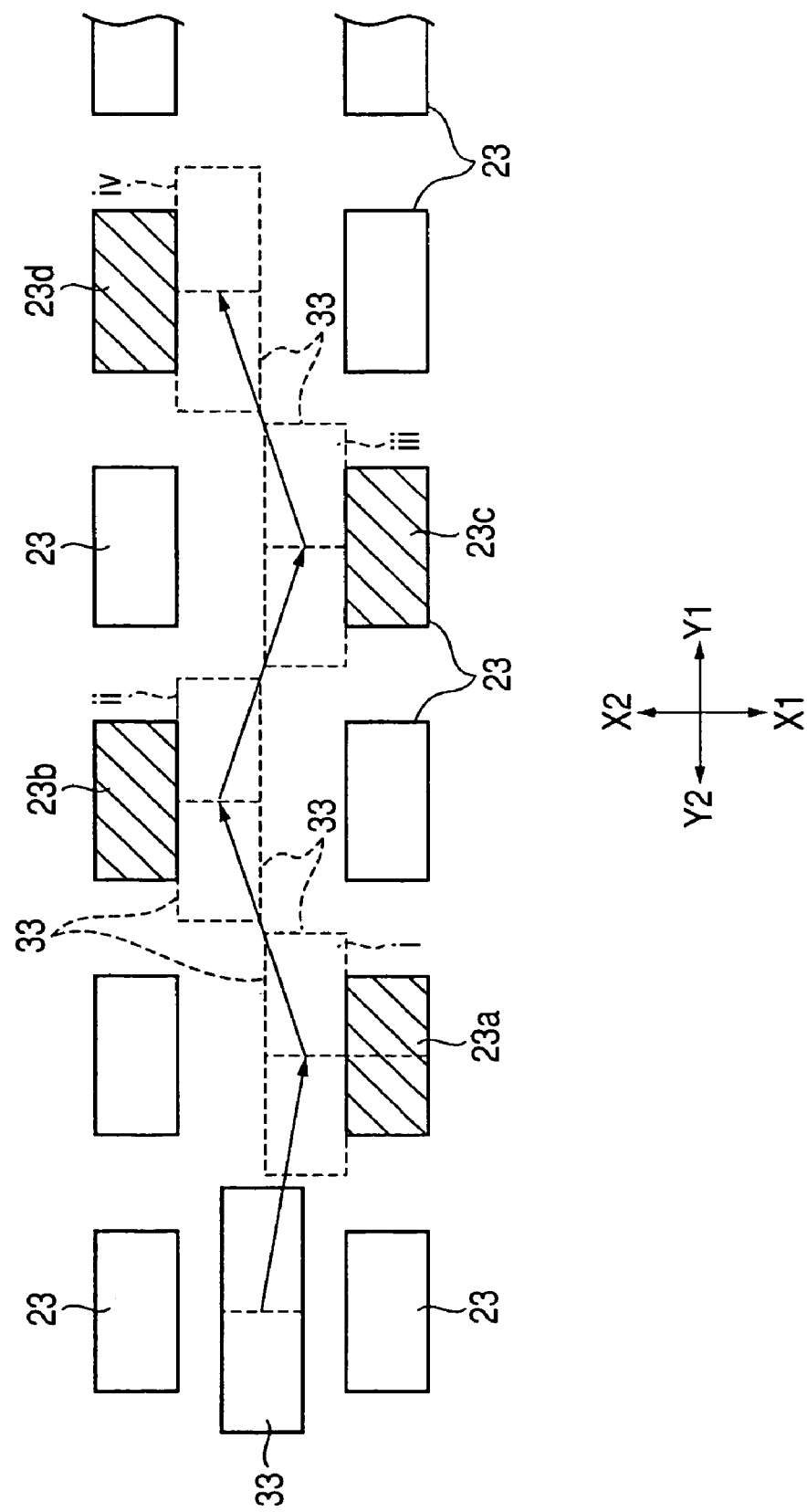
FIG. 8 is a view for explaining another driving method, which partially shows the arrangement in stator-side electrodes mover-side electrodes as shown in FIG. 5.

Next, the electrostatic suction driving apparatus according to a second embodiment of the invention will be described. FIG. 8 is a view for explaining another driving method, which is a partial plan view showing the arrangement in a stator-side electrodes and mover-side electrodes as shown in FIG. 5.

The electrostatic suction driving apparatus according to the second embodiment is substantially same as the electrostatic suction driving apparatus according to the first embodiment except two points of view below.

A first point is, that the electrodes on the stator 23 are connected to the conductive part 24 disposed on the facing surface 20a (the stator facing surface) in the width direction to form one electrode group in the first embodiment, whereas the respective electrodes E on the stator 23 are insulated and formed independently in the second embodiment. As a result, through holes or line patterns that are respectively connected to the electrodes on the stator 23 are formed on the rear surface of the stator 20 (a plane of the Z2 side) (not shown). Further, the conductive pad having individual line pattern and the connection pad on the substrate 40 can be connected by a means as shown in FIG. 4, and an electrical signal can be applied to each of the electrodes on the stator 23.

A second point is that the guide grooves 21 and 21 for forming the guiding means are not provided, and the guide convex parts 31 and 31 are supported on the flat facing surface 20a in a state in which they can move freely in the moving direction and the width direction. As a result, each of the electrodes on the stator 23 and the mover-side electrodes 33 serves as a guiding means.

Moreover, the present embodiment includes a control part for applying a predetermined voltage to predetermined electrodes on the stator.

As shown in FIG. 8, a case where the mover-side electrodes 33 are located at a location indicated by solid line in the Y2 direction is set as an initial state. The control part applies a predetermined voltage to only electrodes on the stator indicated by reference numeral 23a in this state. The mover-side electrodes 33 are thus sucked by electrostatic suction force generated between the mover-side electrodes 33 and the electrodes on the stator 23a, and thus is moved to a location i that is indicated by dotted line of FIG. 8. That is, the mover-side electrodes 33 move up to a location where the center of a moving direction of the mover-side electrodes 33 against a moving direction (Y direction) is coincident with the center of the electrodes on the stator 23 in the moving direction, and moves in the X1 direction that comes in contact with the electrodes on the stator 23a against the width direction (X direction).

Thereafter, the control part applies a predetermined voltage to only electrodes on the stator indicated by reference numeral 23b. Thus, the mover-side electrodes 33 move from the location i to a location ii, as described above. In this manner, the mover-side electrodes 33 can move along a zigzag trace indicated by the location i)→the location ii)→the location iii)→the location iv) when the control part sequentially applies a voltage to the electrodes on the stator 23a, 23b, 23c and 23d indicated by hatching of FIG. 8. As a result, the mover 30 can move in the Y1 direction. On the contrary, the mover 30 can move along the zigzag trace in the Y2 direction, when a voltage is sequentially applied to the electrodes on the stator 23d, 23c, 23b and 23a.

The second embodiment does not include the guiding means as in the first embodiment. Thus, the mover 30 can be moved in the X direction, i.e., along the zigzag trace. In this case, the range of the mover 30 that moves in the X direction is within a range in which the electrodes on the stator 23 and the mover-side electrodes 33 can move in the width direction, i.e., within a gap between the electrodes on the stator 23 and the mover-side electrodes 33. As a result, electrodes on the stator 23 and the mover-side electrodes 33 may be served as a guiding means that guides the mover 30 in the moving direction.

Figure 9:
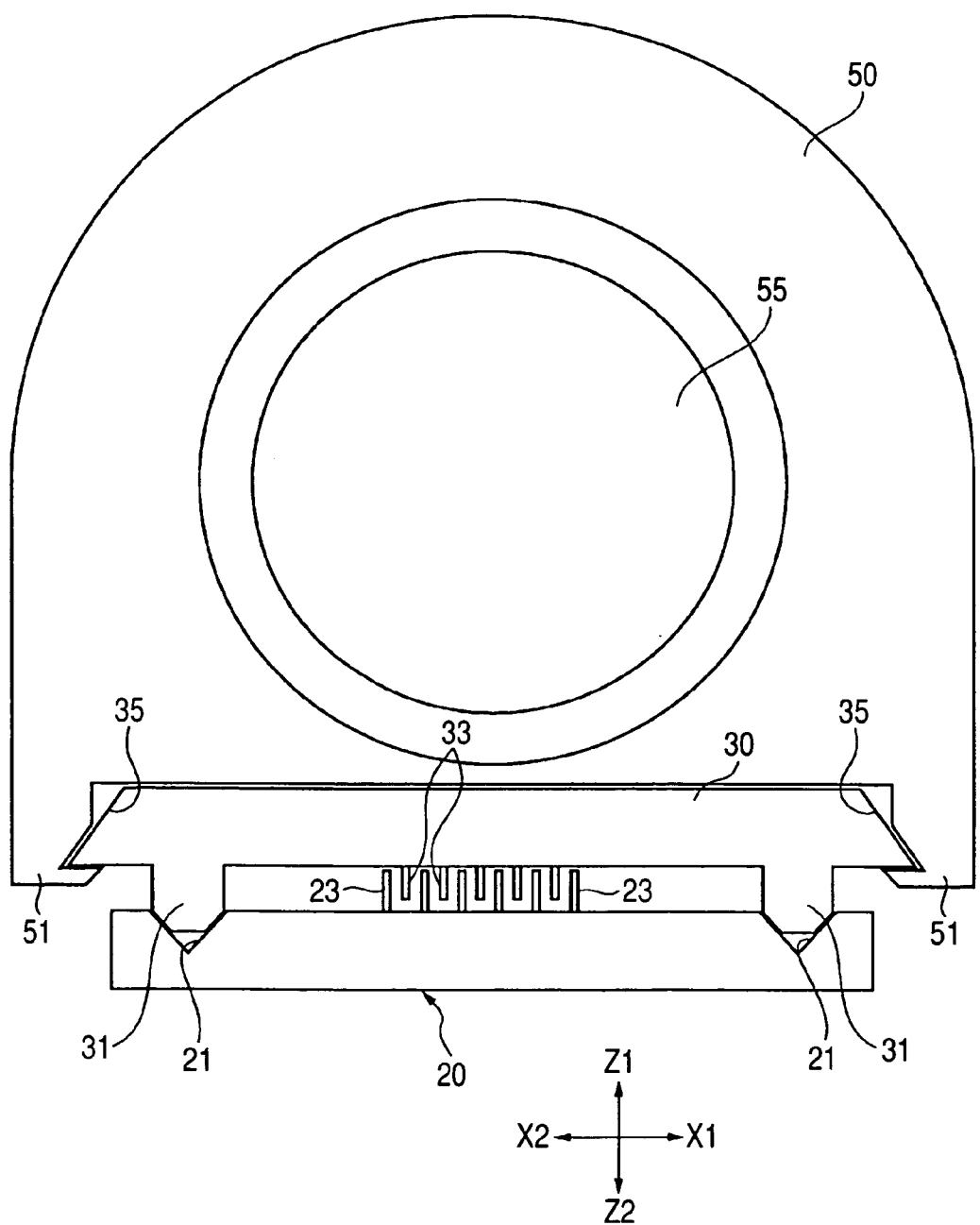
FIG. 9 is a front view illustrating a lens-driving means according to an applicable example of the electrostatic suction driving apparatus.
Figure 10:
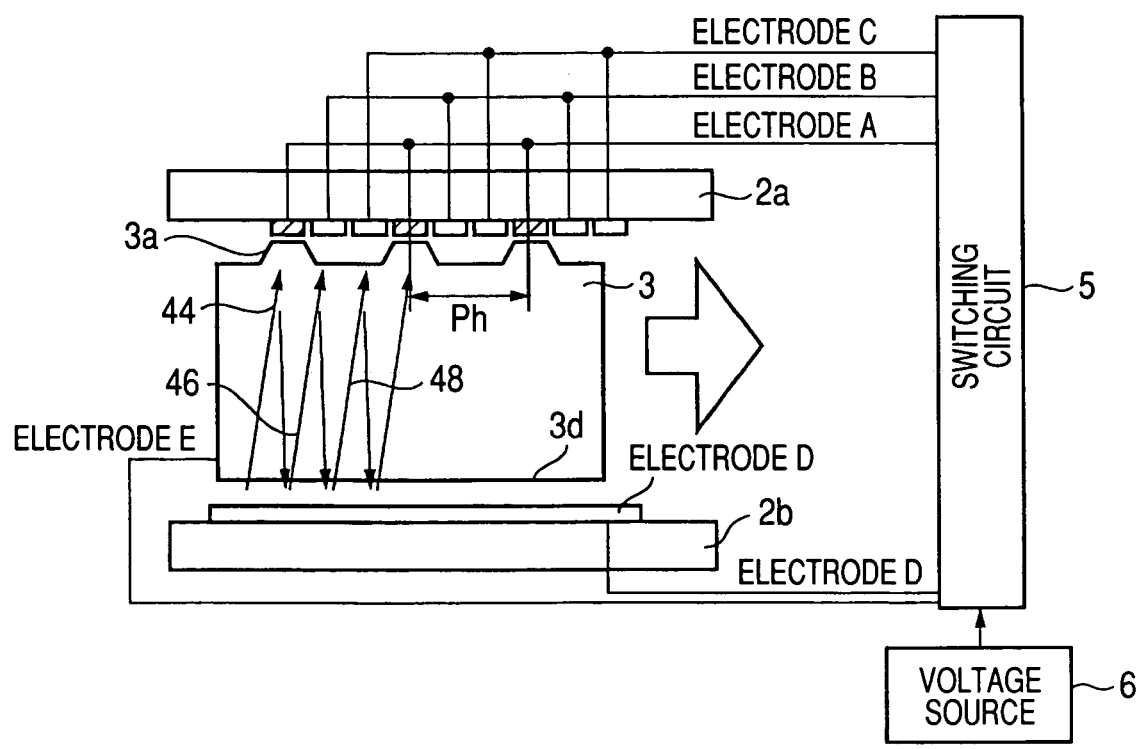
FIG. 10 is a schematic block diagram of the electrostatic suction driving apparatus shown in FIG. 1 of Japanese Unexamined Patent Application Publication No. 2001-346385.
Figure 11:
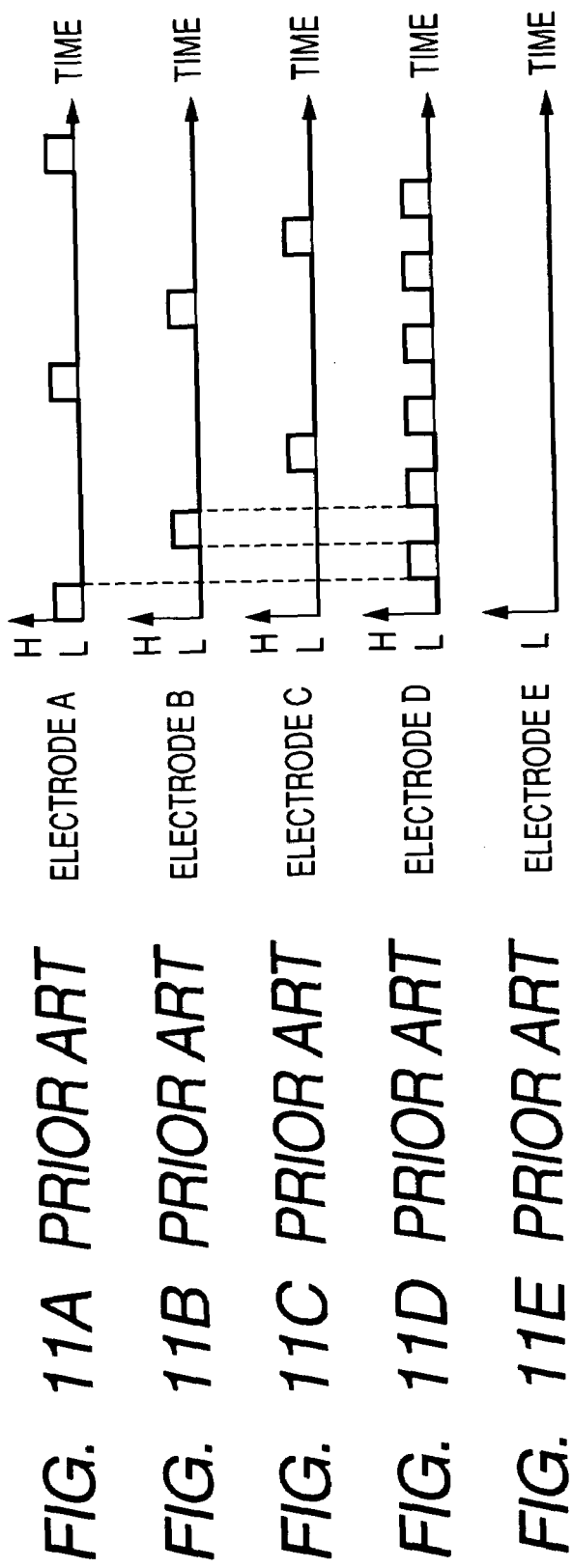
FIG. 11 is a timing chart of electrical signals shown in FIG. 2 of Japanese Unexamined Patent Application Publication No. 2001-346385.

The aforementioned electrostatic suction driving apparatus can be used as a lens-driving means for auto focusing, which is mounted in a mobile phone, a digital camera or the like, and moves a lens in the camera in a focal direction so as to form a focal distance. FIG. 9 is a front view illustrating the lens-driving means as an applicable example of the electrostatic suction driving apparatus.

In FIG. 9, formed are tapered portions 35 and 35 in which edges of the mover 30 are cut out obliquely in a width direction. A lens holder 50 for holding a lens 55 is fixed to the tapered portions 35 and 35. Hook portions 51 and 51 are formed at opposite ends of the lens holder 50 in the width direction.

The lens holder 50 is snapped in the Z2 direction with the Hook portions 51 and 51 being oriented toward the mover 30 so that the Hook portions 51 and 51 are latched to the tapered portions 35 and 35. With this construction, the lens holder 50 can be easily mounted in the mover 30.

In the lens driving means, a predetermined electrical signal to the electrodes on the stator 23 and the mover-side electrodes 33 as described above is applied so that the mover 30 having the lens holder 50 mounted therein can move in the moving direction perpendicular to the surface, i.e., a focal direction.

An electrostatic suction driving apparatus according to a third embodiment will now be described.

The construction of the electrostatic suction driving apparatus according to the third embodiment is substantially same as the electrostatic suction driving apparatus according to the first embodiment except for the construction of guiding means. Thus, only components different from those of the electrostatic suction driving apparatus according to the first embodiment will be described for simplicity.

Figure 12:
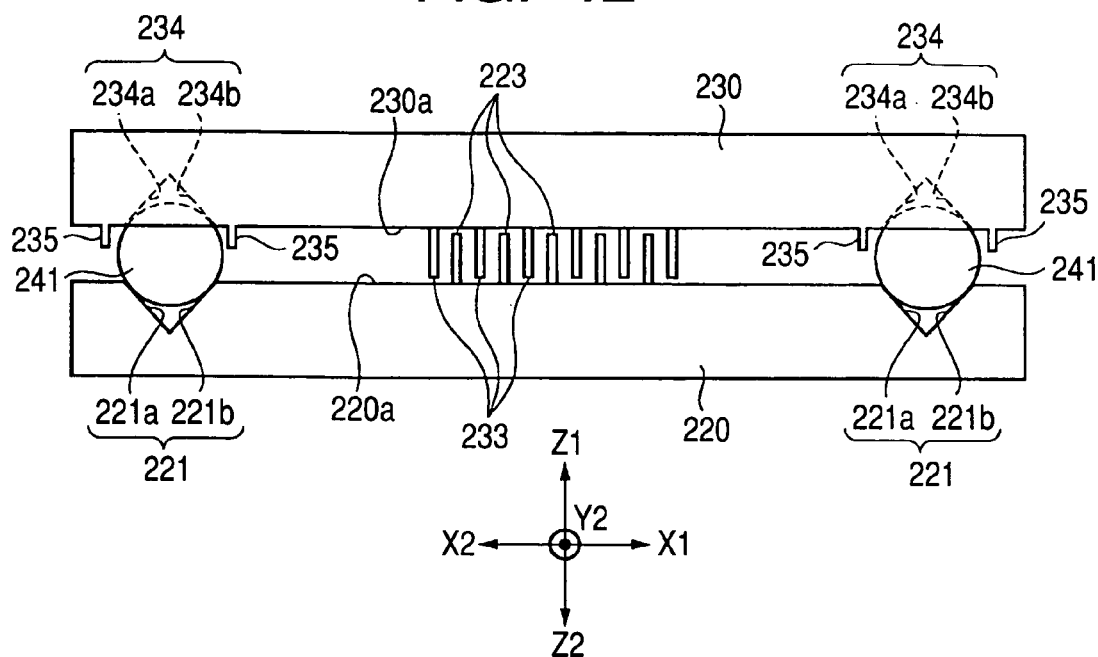
FIG. 12 is a front view illustrating an electrostatic suction driving apparatus according to a third embodiment of the invention.
Figure 13:
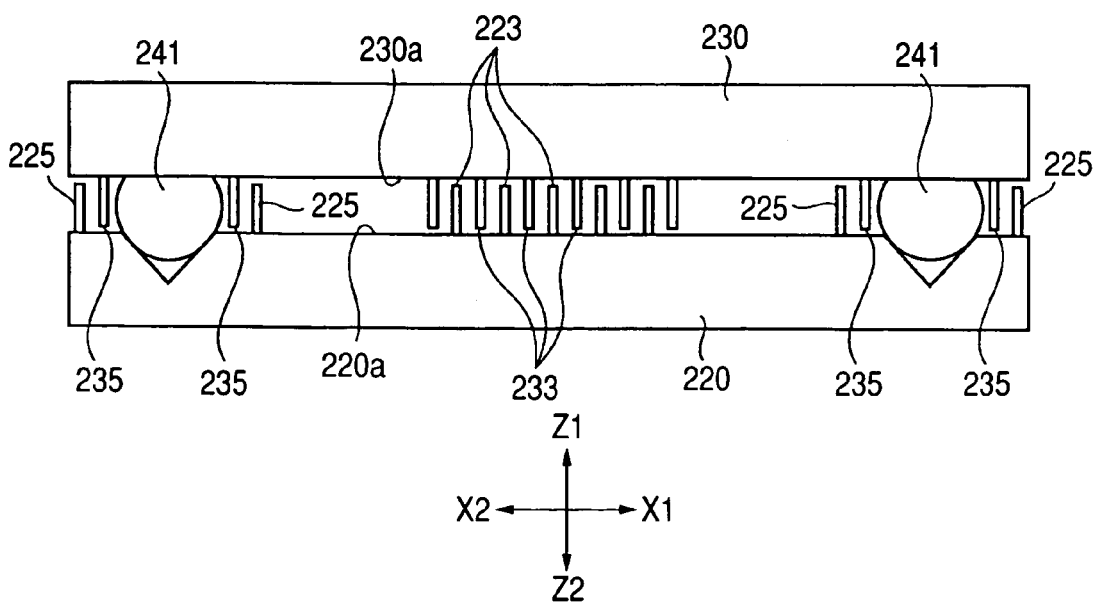
FIG. 13 is a front view illustrating an electrostatic suction driving apparatus according to an alternative example of the second embodiment of the invention.

FIG. 12 is a front view illustrating an electrostatic suction driving apparatus according to a third embodiment of the invention. FIG. 13 is a front view illustrating an electrostatic suction driving apparatus according to an alternative example of the second embodiment of the invention.

The electrostatic suction driving apparatus of the third embodiment shown in FIG. 12 is different from those of the first embodiment in that spherical bodies 241 as rolling bodies are used as sliding convex parts 231 and 231.

At opposite ends of a facing surface 230a on a mover 230 in a width direction are formed retaining grooves 234 and 234 that face guide grooves 221 and 221 formed in a stator 220. The retaining grooves 234 and 234 are in the form of V or trapezoid having a first inclined plane 234a and a second inclined plane 234b in a manner similar to the guide grooves 221. A plurality of the spherical bodies 241 is retained in the retaining grooves 234 and 234 on the mover 230, and is adapted to be rollable within a space where the guide grooves 221 and 221 and the retaining grooves 234 and 234 face each other.

If the spherical bodies are formed of a non-magnetic material or an insulating material, it is possible to prevent electrostatic suction force from lowering, which is generated as external magnetic field affects portions where electrodes 223 on the stator and electrodes 233 on the mover face each other. Furthermore, for example, if the spherical bodies 241 are formed of an elastic material such as silicon rubber, the influence from external shock can be mitigated. In addition, the same is true to rolling bodies in subsequent embodiments.

The spherical bodies 241 are retained with their locations limited at two or more points of the retaining grooves 234. That is, the spherical bodies 241 are retained in a width direction and a height direction with locations thereof limited at two points of the first inclined plane 234a and the second inclined plane 234b in the width direction and the height direction, when the retaining grooves 234 have the V shape. The spherical bodies 241 are retained in the width direction and the height direction with locations thereof limited at three points of the first inclined plane 234a, the second inclined plane 234b, and a plane portion that connects both of the inclined planes 234a and 234b, when the retaining grooves 234 have a trapezoid shape. Therefore, the mover 230 is allowed to be driven in a stable manner since movement of the mover 230 is limited in the moving direction.

The spherical bodies 241 roll in the guide grooves 221 and 221 in the moving direction while rolling within the retaining grooves 234 and 234, when component in the moving direction of the electrostatic suction force acts on the mover 230. It is thus possible to transport the mover 230 in the moving direction.

In addition, the mover 230 is sucked towards a direction in which it approaches the stator 220 by component generated in the height direction of electrostatic suction force. This prevents the spherical bodies 241 from being easily separated from the retaining grooves 234 and 234.

The spherical bodies 241 are constructed to come in contact with two points or three points on the guide grooves 221 and the retaining grooves 234. Thus, sliding friction between them can be significantly reduced. Accordingly, the mover 230 can surely travel even by small driving force serving as electrostatic suction force.

As shown in FIG. 12, wall portions 235 and 235 extending in the moving direction are formed at opposite ends of the retaining grooves 234 and 234 in the mover 230. Thus, the spherical bodies 241 is supposed to come in contact with the wall portions 235 and 235 and then automatically go back within the retaining grooves 234, although the spherical bodies 241 are separated from the retaining grooves 234 due to shock or the like that is applied to the electrostatic suction driving apparatus. That is, the wall portions 235 and 235 serve as a means for preventing groove from being separated out of the spherical body 241.

Furthermore, the wall portions 235 and 235 serve as guiding means when the spherical bodies 241 are inserted into the retaining grooves 234 and 234. This leads to improved work efficiency for inserting the retaining grooves 234 and 234 into the spherical bodies 241. Moreover, as shown in FIG. 13, the wall portions 225 and 225 on one side come in contact with the wall portions 235 and 235 on the other side before the spherical bodies 241 are separated therefrom, when wall portions 225 and 225 are formed in a stator 220 and are provided next to wall portions 235 and 235 on the part of a mover 230 as described above. This prevents the mover 230 from moving in the width direction. It is thus possible to prevent the spherical bodies 241 from being separated therefrom.

Figure 14:
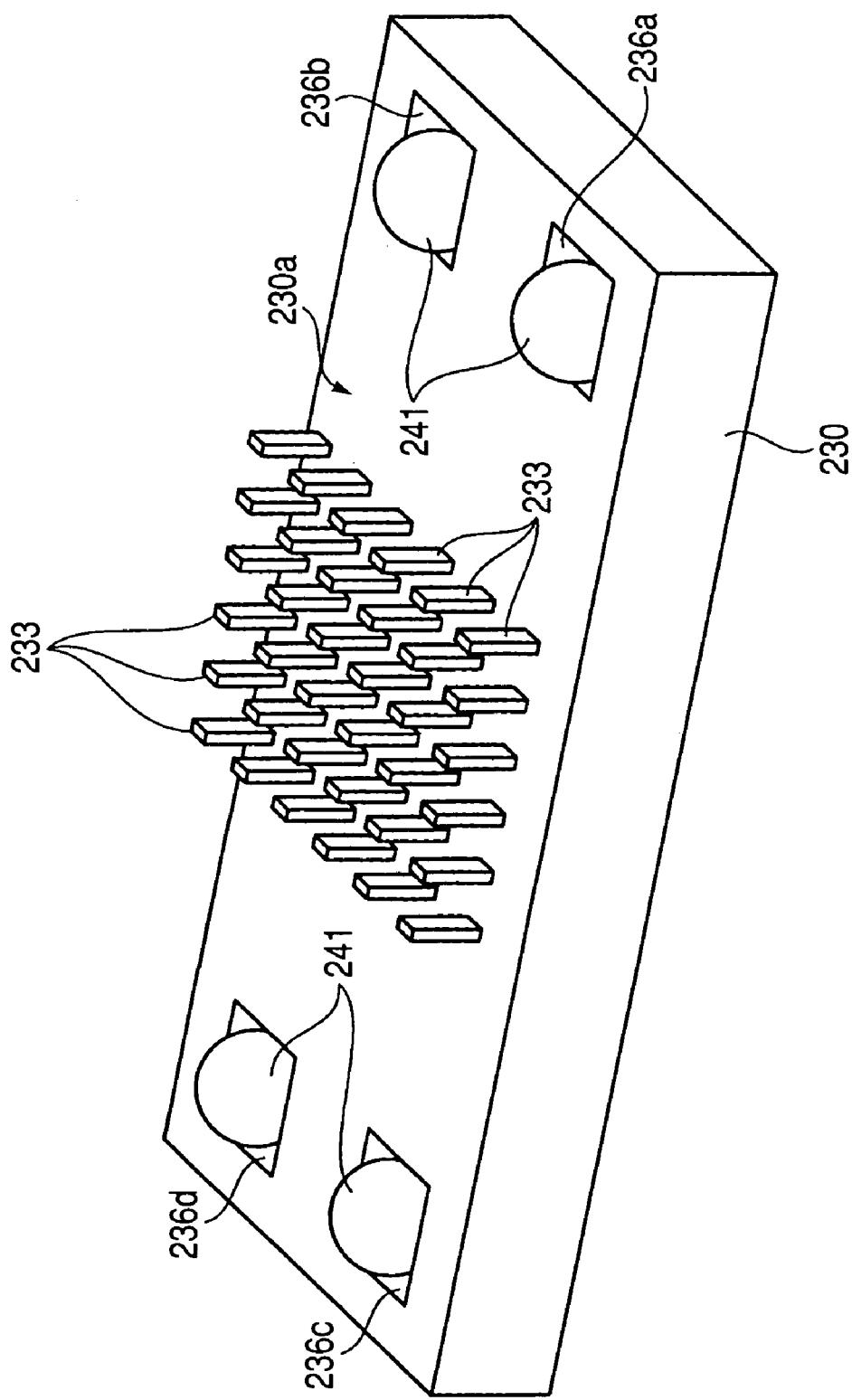
FIG. 14 is a perspective view illustrating a mover in an electrostatic suction driving apparatus according to a fourth embodiment of the invention.

FIG. 14 is a perspective view illustrating a mover in an electrostatic suction driving apparatus according to a fourth embodiment of the invention.

As shown in FIG. 14, in the fourth embodiment, four retaining holes 236a, 236b, 236c and 236d are formed at opposite ends of a facing surface 230a on a mover 230 in a width direction.

The retaining hole 236a and the retaining hole 236b are formed to extend in the moving direction, and the retaining hole 236c and the retaining hole 236d are also formed on the same straight line as extended in the moving direction.

All of the four retaining holes 236a, 236b, 236c and 236d are in the form of a square. Spherical bodies 241 are retained rollably within the four retaining holes 236a, 236b, 236c and 236d, respectively.

The mover 230 is mounted in the stator 220 as in the fourth embodiment of the invention. In this case, as the spherical bodies 241 are inserted into the guide grooves 221 and 221 disposed in the stator 220 respectively in the same manner as FIG. 12 so that they can move within the guide grooves 221 and 221 in the moving direction.

Moreover, the spherical bodies 241 roll in the guide grooves 221 and 221 in the moving direction while rolling within the retaining holes 236a, 236b, 236c and 236d, when component in the moving direction of electrostatic suction force acts between the electrodes 223 on the stator and the electrodes 233 on the mover. Accordingly, the mover 230 can be transported in the moving direction.

In the fourth embodiment of the invention, the mover 230 can be surely transported in the moving direction even by small electrostatic suction force, since frictional resistance between the respective spherical bodies 241 and the respective retaining holes 236a, 236b, 236c and 236d is small.

Figure 15:
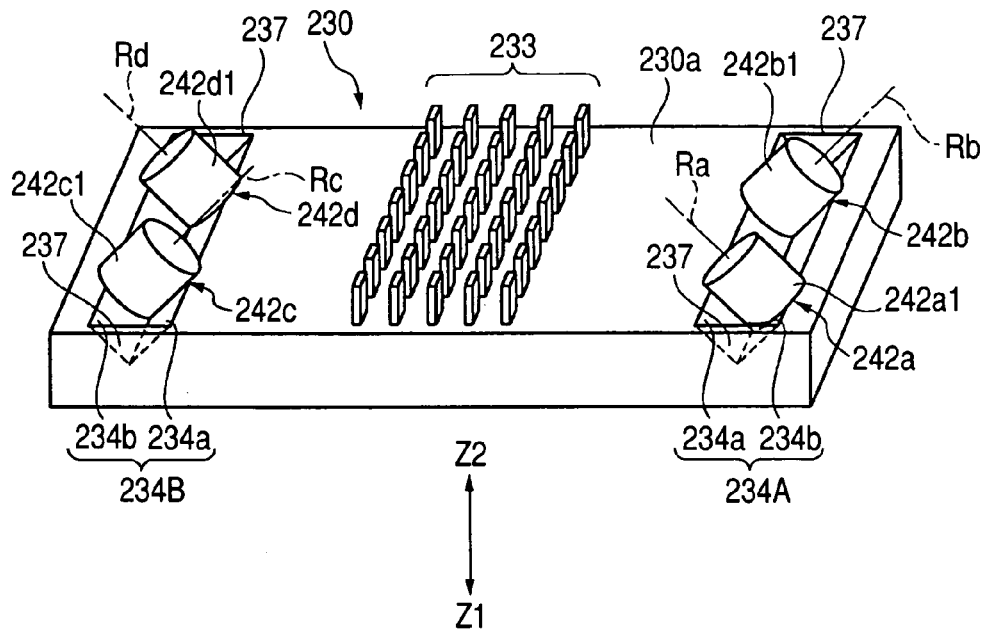
FIG. 15 is a perspective view illustrating a mover in an electrostatic suction driving apparatus according to a fifth embodiment of the invention.
Figure 16:
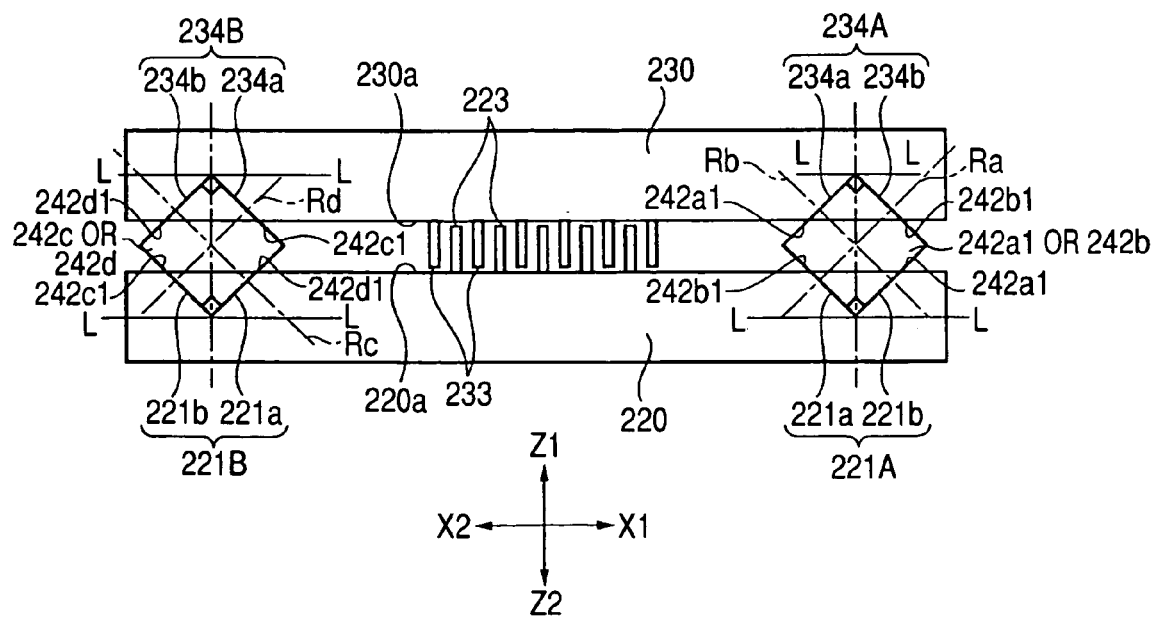
FIG. 16 is a cross-sectional view illustrating the electrostatic suction driving apparatus using the mover shown in FIG. 15.

FIG. 15 is a perspective view illustrating a mover in an electrostatic suction driving apparatus according to a fifth embodiment of the invention. FIG. 16 is a cross-sectional view illustrating the electrostatic suction driving apparatus using the mover shown in FIG. 15.

In the fifth embodiment shown in FIG. 15, V shaped retaining grooves 234A and 234B extended in the moving direction are formed at opposite ends of a mover 230. A first inclined plane 234a (an inclined plane within the width direction) and a second inclined plane 234b (an inclined plane outside the width direction), both of which form the retaining grooves 234A and 234B, are inclined by 45° in an opposite direction against a parallel line L—L parallel to an X axis. Accordingly, the first inclined plane 234a and the second inclined plane 234b face each other at a 90 degree included angle.

The retaining grooves 234A and 234B have a plurality of cylindrical bodies 242 as rolling bodies disposed therein. The cylindrical bodies 242 are formed of an elastic rolling material, and are preferably formed of a non-magnetic material such as silicon rubber.

As shown in FIGS. 15 and 16, in the retaining groove 234A in the X1 direction, the cylindrical body 242a disposed at the front are disposed such that a rotating axis Ra thereof is parallel to the first inclined plane 234a. Further, the cylindrical body 242b is disposed at the rear such that such that a rotating axis Rb thereof is parallel to the second inclined plane 234b. As a result, the cylindrical body 242a and the cylindrical body 242b are retained in the retaining grooves 234 on one side in such a manner that the cylindrical body 242a can roll with a side 242a1 come in contact with the first inclined plane 234a, and the cylindrical body 242b can roll with a side 242b1 come in contact with the second inclined plane 234b.

In the same manner as described above, in the retaining groove 234B in the other X2 direction, a cylindrical body 242c is disposed at the front such that a rotating axis Ro thereof is parallel to the first inclined plane 234a. As a result, the cylindrical body 242c and the cylindrical body 242d are retained in the retaining grooves 234 on one side in such a manner that the cylindrical body 242c can roll with a side 242c1 come in contact with the first inclined plane 234a, and the cylindrical body 242d can roll with a side 242d1 come in contact with the second inclined plane 234b.

In addition, in FIG. 15, the two cylindrical bodies 242a and 242b are disposed in the retaining groove 234A, and the two cylindrical bodies 242c and 242d are disposed in the retaining groove 234B on the other side. In addition, a plurality of the cylindrical bodies 242 may also be disposed. In this case, it is preferable that a slant of each rotating axis is alternately different in the moving direction.

Moreover, as shown in FIG. 15, protection walls 237 for preventing the rolling cylindrical bodies 242 from deviating from the retaining grooves 234A and 234B in the moving direction is preferably disposed at the front and rear ends of the retaining grooves 234A and 234B.

As shown in FIG. 16, a mover 230 shown in the fifth embodiment is mounted on a stator 220 as well in the same manner as in the above embodiment. Guide grooves 221A and 221B corresponding to retaining grooves 234A and 234B are formed along a moving direction at opposite ends of the stator 220 in the width direction. The guide grooves 221A and 221B are V-shaped grooves in which a first inclined plane 221a and a second inclined plane 221b are inclined by 45° in an direction opposite to each other across a parallel line L—L parallel to an X axis. Both of the inclined planes face each other at a 90° included angle.

As shown in FIG. 16, in a state where the mover 230 and the stator 220 face each other, the respective cylindrical bodies 242 are inserted into the retaining grooves 234A and 234B on the mover 230 and the guide grooves 221A and 221B on the stator 220. That is, on the guide grooves 221A on one side, a side 242a1 of a cylindrical body 242a comes in contact with the second inclined plane 221b of the guide grooves 221, and a side 242b1 of a cylindrical body 242b comes in contact with the first inclined plane 221a of the guide grooves 221A. In a similar manner, on the guide grooves 221B on the other side, a side 242c1 of a cylindrical body 242c comes in contact with the second inclined plane 221b of the guide grooves 221, and a side 242d1 of a cylindrical body 242d comes in contact with the first inclined plane 221a of the guide grooves 221A.

Furthermore, the cylindrical bodies 242 roll along the moving direction in the retaining grooves 234A and 234 and the guide grooves 221A and 221B, when component in the moving direction of electrostatic suction force acts between the electrodes 223 on the stator and the electrodes 233 on the mover. It is thus possible to transport the mover 230 in the moving direction.

Even in the fourth embodiment, frictional resistance between the cylindrical body 242 and the retaining grooves 234A and 234B, and frictional resistance between the cylindrical body 242 and the guide grooves 221A and 221B is small. Therefore, the mover 230 can be surely transported by small electrostatic suction force in the moving direction.

Figure 17:
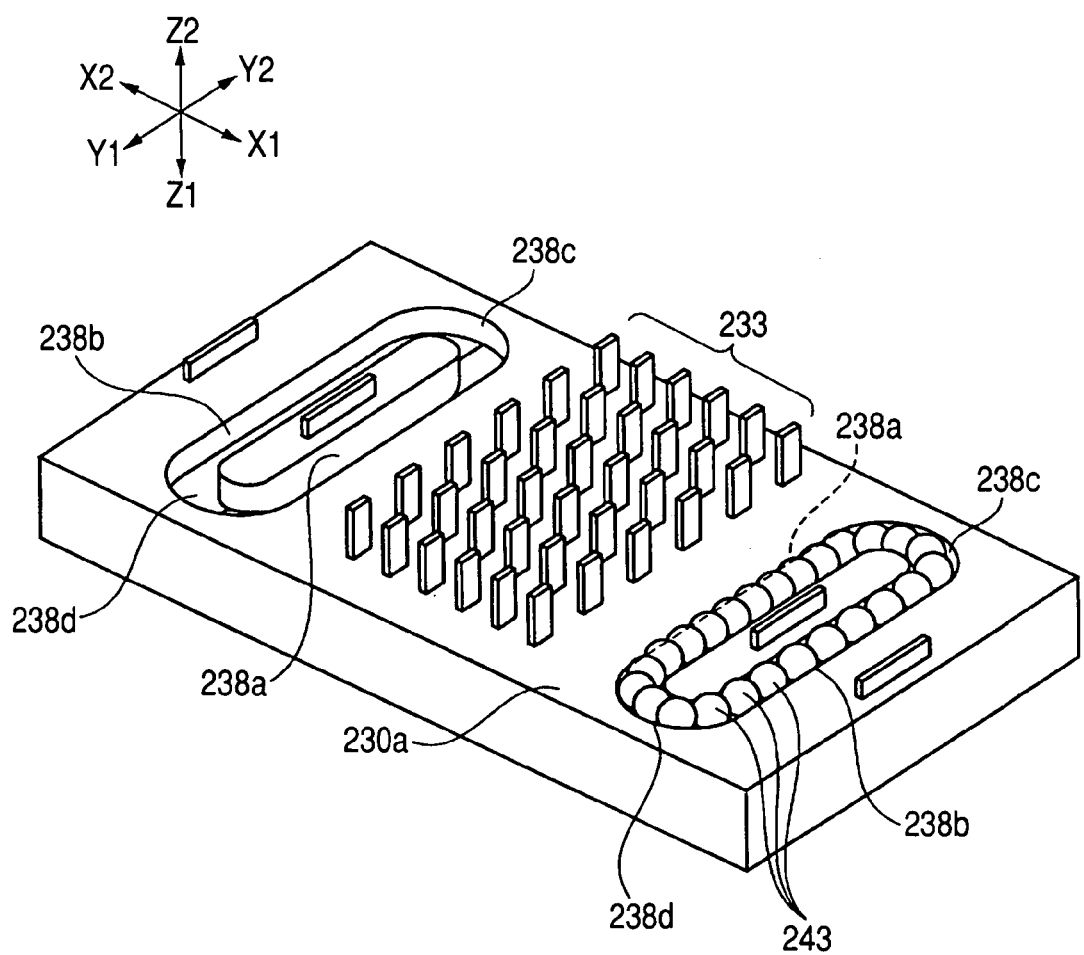
FIG. 17 is a perspective view illustrating a mover in an electrostatic suction driving apparatus according to a sixth embodiment of the invention.
Figure 18:
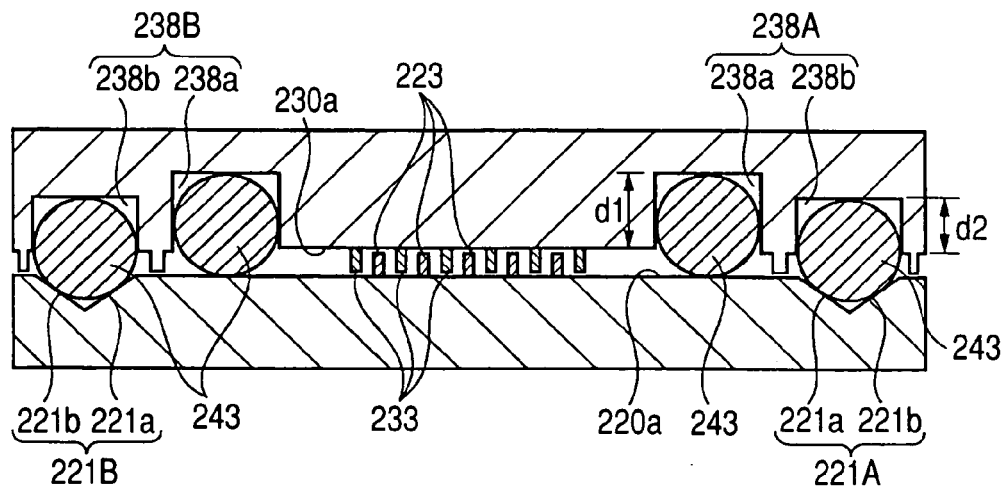
FIG. 18 is a cross-sectional view illustrating an electrostatic suction driving apparatus using the mover shown in FIG. 17.

FIG. 17 is a perspective view illustrating a mover in an electrostatic suction driving apparatus according to a sixth embodiment of the invention. FIG. 18 is a cross-sectional view illustrating the electrostatic suction driving apparatus using the mover shown in FIG. 17.

In the sixth embodiment shown in FIGS. 17 and 18, circulating grooves 238A and 238B are formed at opposite ends of a mover 230 in a width direction. The circulating grooves 238A and 238B include a pair of parallel grooves 238a and 238b extended parallel to the moving direction, and U-shaped grooves 238c and 238d for connecting the grooves 238a and 238b parallel to each other in the Y1 and Y2 directions. The circulating grooves 238A and 238B generally are O-shaped grooves. As shown in FIG. 18, however, the depth d1 of the groove 238a internally disposed in the width direction is deeper than the depth d2 of the groove 238*b* externally disposed in the width direction (d1>d2). Further, the bottom of the U-shaped grooves 238*c* and 238*d* for connecting the groove 238*a* and the groove 238*b* parallel to each other has a smooth inclined plane.

As shown in FIGS. 17 and 18, a plurality of spherical bodies 243 are disposed in the circulating grooves 238A and 238B. In addition, in FIG. 17, the spherical bodies 243 in the circulating groove 238B in the X2 direction are omitted. The respective spherical bodies 243 come in contact with each other in the circulating grooves 238A and 238B. The spherical bodies 243 can move while circulating in the circulating groove 238A and 238B with them arranged in a row along the shape of the circulating grooves 238A and 238B clockwise and counterclockwise. In this case, the spherical bodies 243 are adapted to smoothly move in a low load state.

As shown in FIG. 18, the electrodes 223 on the stator and the electrodes 233 on the mover face each other, when the mover 230 is mounted on the stator 220. Further, the spherical bodies 243 and 243 disposed in the grooves 238*b* and 238*b* parallel to each other are inserted into the guide grooves 221 and 221 facing the stator 220. Meanwhile, the grooves 238*a* and 238*a* disposed inside to be parallel to each other face the facing surface 220*a* on the stator 220.

In this state, the spherical bodies 243 in the outside groove 238*b* come in contact with the bottom of the groove 238*b* and the first and second inclined planes 221*a* and 221*b* for forming the guide grooves 221 in the height direction. Meanwhile, the spherical bodies 243 in the inside groove 238*a* come in contact with the facing surface 220*a* on the stator 220, but is not in contact with the bottom of the groove 238*a* in the height direction. That is, the mover 230 is supported only by a plurality of the spherical bodies 243 extended in the moving direction in the outside groove 238*b*. A plurality of the spherical bodies 243 extended in the moving direction in the inside groove 238*a* have no relation to support of the mover 230.

In this state, component in the moving direction of electrostatic suction force acts between the electrodes 223 on the stator and the electrodes 233 on the mover so that the mover 230 can move in the moving direction.

At this time, for example, assuming that the moving direction of the mover 230 indicates the Y1 direction, the spherical bodies 243 in the outside groove 238*b* move in the Y2 direction opposite to the moving direction of the mover 230 while rolling between the groove 238*b* and the guide grooves 221 parallel to each other, and then reaches the U-shaped groove 238*c* in the Y2 direction. Accordingly, the spherical bodies 243 in the inside groove 238*a* are pushed by the spherical bodies 243 reached the U-shaped groove 238*c* to be extruded into the outer groove 238*b*. In this case, the spherical bodies 243 in the inside groove 238*a* roll only on the facing surface 220*a* on the stator 220 without coming in contact with the bottom of the mover 230, whereby frictional resistance in the inside groove 238*a* can be reduced.

Therefore, each of the spherical bodies 243 on the circulating groove 238A in FIG. 17 is circulated clockwise in the circulating groove 238A and each of the spherical bodies 243 on the circulating groove 238B is circulated counterclockwise in the circulating groove 238B, when the mover 230 moves in the Y1 direction.

Even in the sixth embodiment, since frictional resistance between the spherical bodies 243 and the circulating grooves 238A and 238B is small, the mover 230 can be surely transported in the moving direction by small electrostatic suction force.

In addition, in the sixth embodiment, it has been described that the groove 238*b* having a shallow depth is disposed outside in the width direction, and the groove 238*a* having a deep depth is disposed inside in the width direction. The same is true of an opposite case. In this case, the guide grooves 221A and 221B are also correspond to the groove 238*b* having a shallow depth to be formed inside.

It is shown in FIG. 6 that a voltage signal is applied to the electrode groups of the A phase to E phase consisting of the electrodes 223 on the stator. In that case, however, the mover 230 is preferably discharged. A static charge is generated in the electrodes 223 on the stator, when a voltage of a high level is applied to each of the electrode groups. Thus, a capacitor is formed between the electrodes 223 on the stator and the electrodes 233 on the mover as a negative charge is induced in the electrodes 233 on the mover. However, the electrodes 233 on the mover become a state where only the electrodes 223 on the stator is set as a low level to charge a negative charge. Therefore, the movement of the mover 230 becomes slow, when the mover 230 is not discharged. This may result in a lowered moving speed or the slow response speed.

In order to solve this problem, the mover 230 can be grounded to a ground potential so that an electrically charged charge is discharged into the ground (ground potential). It is difficult to ground the moving mover to the ground potential, and a negative charge necessary for the electrodes 233 on the mover may not be induced when the mover 230 is always maintained in a grounded state. Accordingly, it is likely that electrostatic suction force is lowered.

Methods for solving the problem will be described below.

Figure 19:
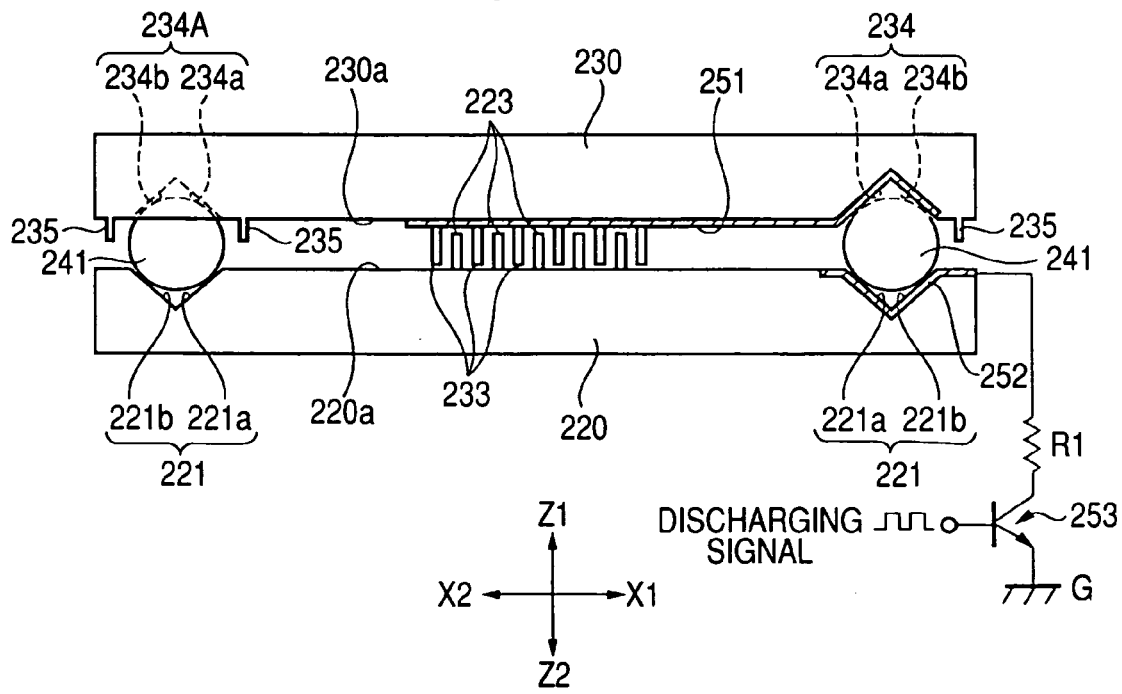
FIG. 19 is a front view illustrating an electrostatic suction driving apparatus having a charge eliminating means.

FIG. 19 is a front view illustrating an electrostatic suction driving apparatus having a charge eliminating means. A basic construction of the electrostatic suction driving apparatus is the same as that of the third embodiment which has been already described with reference to FIG. 12.

As shown in FIG. 19, a conductive film 251 is formed on a facing surface 230*a* on a mover 230 made of an insulating material. A plurality of electrodes 233 on the mover is formed on a surface of the conductive film 251. The conductive film 251 is formed to extend into at least one of retaining grooves 234 and to cover surfaces of the retaining grooves 234 extended in a moving direction.

A conductive film 252 is also formed on guide grooves 221 in a stator 220, which face the retaining grooves 234. The conductive film 252 is formed to cover one of surfaces of the guide grooves 221 extended in a moving direction. The conductive film 252 and a ground G is connected through a switch element 253 consisting of a predetermined resistor R, a transistor or the like. The switch element 253 serves to connect the resistor R1 and the ground G in response to a predetermined signal.

Spherical bodies 241 disposed between the retaining grooves 234 and the guide grooves 221 are formed of a conductor. However, all of the spherical bodies 241 need not to be formed of the conductor. Other spherical bodies 241 can be formed of a non-insulating material or an insulator.

A discharge signal as shown in FIG. 6 is applied to the switch element 253. Thus, if a voltage is applied to electrode groups having respective phases, the switch element 253 can be set as a connection state (ON state) immediately thereafter. As described above, a charge charged into the mover 230 can be discharged. It is thus possible to prevent electrostatic suction force from lowering, and also to prevent decrease in the moving speed or the response speed.

A seventh embodiment will now be described.

The construction of the electrostatic suction driving apparatus according to the seventh embodiment is substantially same as that of the first embodiment except for a material of a mover or the like. For this reason, a construction different from that of the first embodiment will be described for simplicity.

Figure 20:
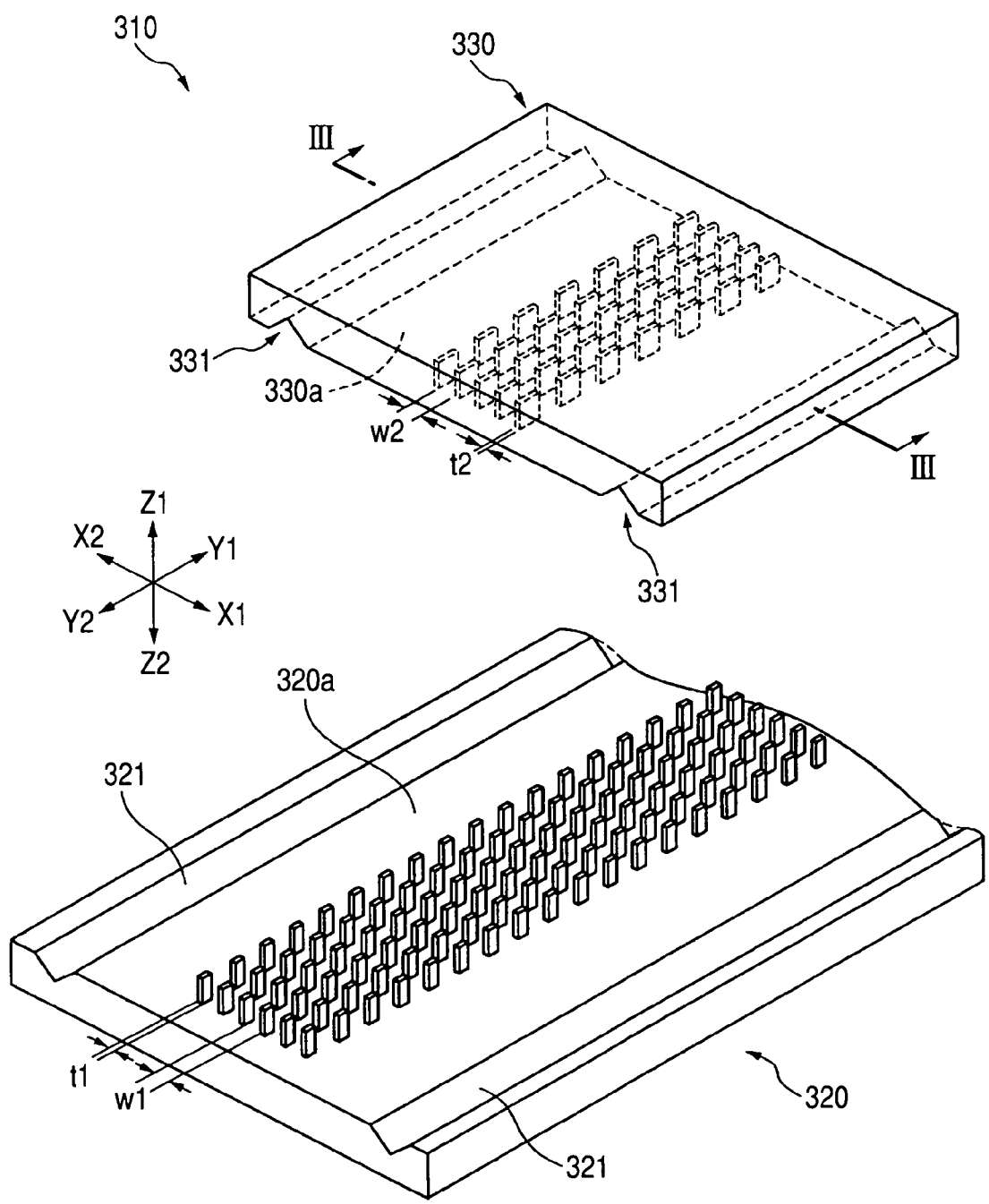
FIG. 20 is an exploded perspective view illustrating an electrostatic suction driving apparatus according to an embodiment of the invention.

As shown in FIG. 20, a plurality of electrodes 323 on the stator is disposed on a facing surface 320a on the stator 320. The electrodes 323 on the stator can be formed by plating and growing a conductive metal such as copper perpendicularly to the Z direction.

In a similar manner, a plurality of electrodes 333 on the mover is also formed on a facing surface 330a on a mover 330. The mover 330 can be formed of a conductor or material having a low resistance such as silicon. The electrodes 333 on the mover can be formed by plating and growing a conductive metal, such as copper, on the surface of the facing surface 330a, which is formed of the conductor or the material having a low resistance perpendicularly to the Z direction.

Further, resin where material having a low resistance is mixed into conductive resin is flown into a mold to be sintered, etc., whereby the entire mover 330 including a plurality of the electrodes 333 on the mover can be integrally formed. In this case, the conductive resin may be a paste type of resin in which silver or the like as conductive filler is mixed with epoxy-based resin. Carbon powder as material having a low resistance can be then mixed with the resin. Further, the mover 330 formed thus constitutes one body having low resistance as a whole. A resistance value in the mover 330 is preferably high in view of insulation breakage and breakdown voltage. It is, however, preferable that the resistance value in the mover 330 be low for better response of the mover 330. In light of such balance, the resistance value preferably ranges from 1 Ω to 1 kΩ.

Figure 21A:
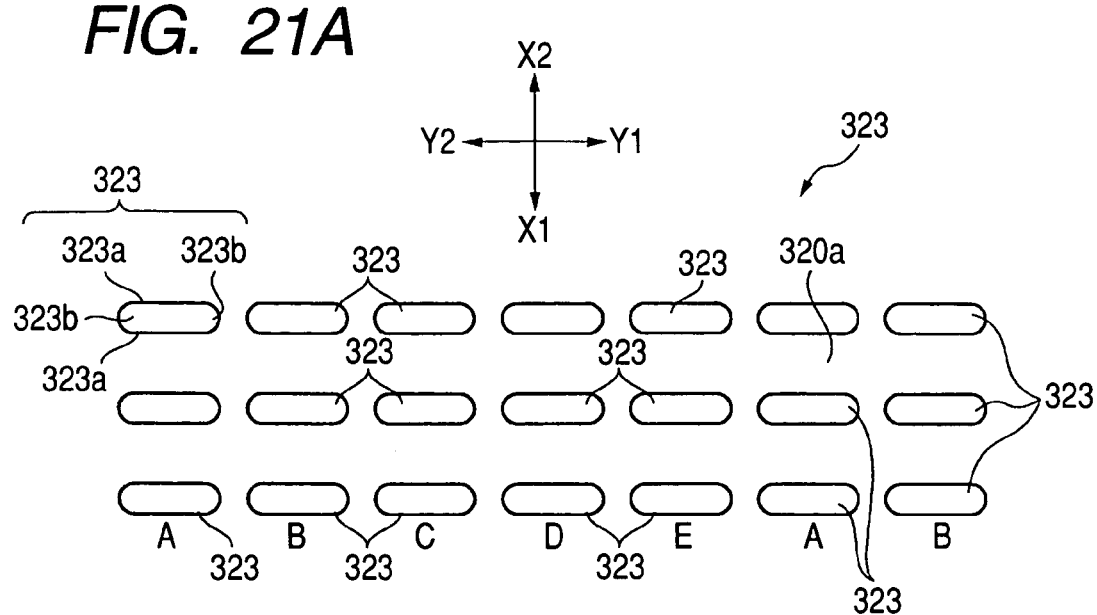
FIG. 21A is an expanded plan view illustrating stator-side electrodes.
Figure 21B:
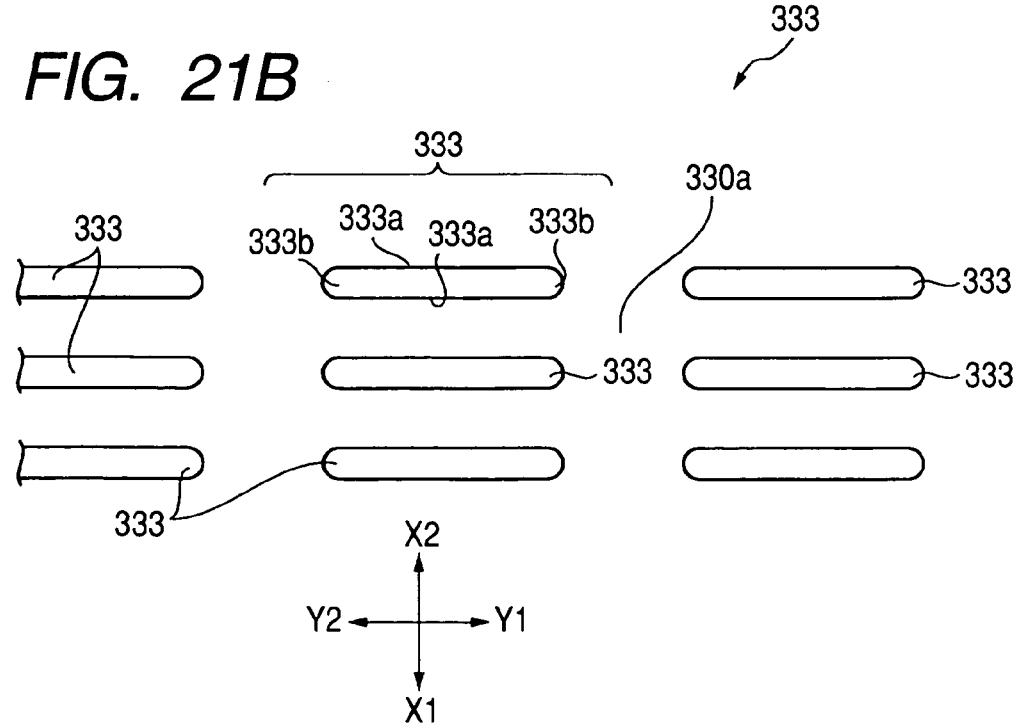
FIG. 21B is an expanded plan view illustrating the mover-side electrodes.

As shown in FIGS. 21A and 21B, when the facing surface 320a or the facing surface 330a is partially exploded on a plane, each of the electrodes 323 on the stator and the electrodes 333 on the mover is substantially in the form of a square.

As shown in FIG. 21A, the electrodes 323 on the stator include a pair of relatively long side portions 323a and 323a parallel to a moving direction (Y direction), and a pair of relatively short side portions 323b and 323b disposed at opposite ends of the moving direction. A pair of the relatively long side portions 323a and 323a form a part of an electrode plane that is directed toward a width direction (X direction). Furthermore, a pair of the relatively short side portions 323b and 323b has a curved surface that is convex in the moving direction (Y1 and Y2 directions), preferably a circular arc surface. A plurality of the electrodes 323 on the stator is arranged on the facing surface 320a in the moving direction and the width direction with them equally spaced apart in a regular manner.

In the embodiment shown in FIG. 21, the electrodes 323 on the stator are formed with N rows in the Y direction (the moving direction) and with 6 columns in the X direction (the width direction). It is, however, to be understood that the arrangement in the electrodes 323 on the stator is not limited to the N rows and 6 columns, but can have greater or smaller rows and columns.

Furthermore, in the present embodiment, the electrodes 323 on the stator (the six electrodes 323 on the stator) that are mounted on the X direction are electrically connected by a means (not shown), and form one electrode group having same voltages. Electrode groups adjacent to each other in the moving direction are electrically insulated. As shown in FIG. 21A, the electrode groups formed by the electrodes on the stator 23 are divided into five electrode groups in order of an A phase electrode group, a B phase electrode group, a C phase electrode group, a D phase electrode group, an E phase electrode group, an A phase electrode group, a B phase electrode group, . . . , on one row basis.

In a similar manner, as shown in FIG. 21B, electrodes 333 on the mover also have a pair of relatively long side portions 333a and 333a and a pair of relatively short side portions 333b and 333b, which are parallel to the moving direction (the Y direction). A pair of the relatively long side portions 333a and 333a form a part of an electrode plane that is directed toward in the width direction (the X direction). Further, a pair of the relatively short side portions 333b and 333b has a curved surface that is convex in the moving direction (the Y1 and Y2 directions), preferably a circular arc surface. A plurality of the electrodes on the stator 333 are arranged on the facing surface 330a in the moving direction and the width direction with them equally spaced apart in a regular manner. In the present embodiment, however, the entire electrodes on the mover 333 are formed by a means (not shown) to have same voltages.

As shown in FIG. 22, the stator 320 and the mover 330 are assembled with the facing surfaces 320a and 330a facing each other. In this case, a plurality of spherical bodies 341 is disposed between guide grooves 321 and 321 and retaining grooves 331 and 331. That is, the mover 330 is supported on the guide grooves 321 and 321 on the stator 320 through a plurality of the spherical bodies 341.

The spherical bodies 341 can be formed of an elastic material having the insulation property, such as silicon rubber. The spherical bodies 341 also support the mover 330 such that the gap of a predetermined size is always formed in the height direction between the facing surface 320a on one side and the facing surface 330a on the other side.

In this state, if force in the moving direction is applied to the mover 330, the spherical bodies 341 roll between the guide grooves 321 and 3211, and the retaining grooves 331 and 331 in the moving direction. The mover 330 can thus move straight in the moving direction. That is, the guide grooves 321 and 321, the retaining grooves 331 and 331, and a plurality of the spherical bodies 341 in the present embodiment serve as guiding means that guide the mover 330 in the moving direction.

Figure 23:
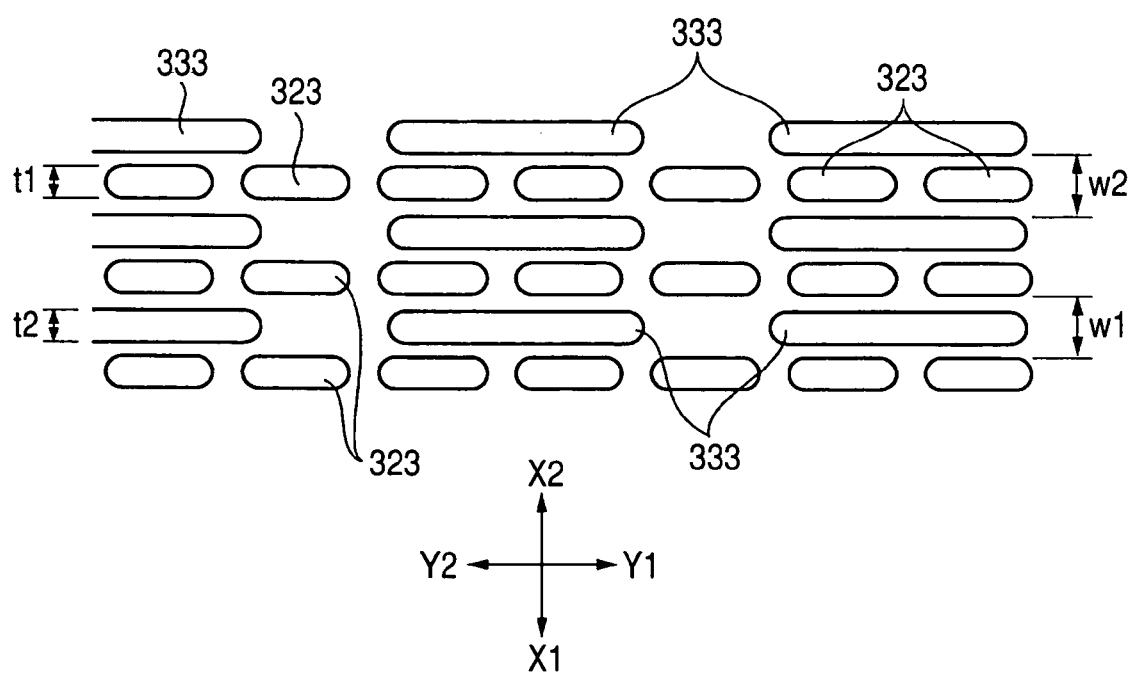
FIG. 23 is an expanded plan view showing a state where the electrodes on the stator and the mover-side electrodes shown in FIGS. 21A and 21B face each other.

As shown in FIGS. 20 and 23, an electrode gap W1 in the width direction of the electrodes 323 on the stator is wider than a thickness t2 in the width direction of the electrodes 333 on the mover. In the same manner, an electrode gap W2 in the width direction of the electrodes 333 on the mover is wider than a thickness t1 in the width direction of the electrodes 323 on the stator. Accordingly, as shown in FIG. 23, in a state where the stator 320 and the mover 330 are assembled together, the electrodes 333 on the mover are inserted between the electrodes 323 on the stator and the electrodes 323 on the stator to which are adjacent in the width direction. The electrode plane on the electrodes 323 of the stator and the electrode plane on the electrodes 333 of the mover face each other.

Furthermore, as shown in FIG. 23, the height of the electrodes 323 on the stator and the electrodes 333 on the mover in the Z direction is set to a degree that the front ends of the electrodes 323 on the stator and the electrodes 333 on the mover are not in contact with the surfaces of the facing surface 320a and the facing surface 330a with the stator 320 and the mover 330 assembled together.

In the state shown in FIGS. 22 and 23, the electrode plane on the electrodes 323 on the stator and the electrode plane on the electrodes 333 on the mover face each other in a parallel manner. Therefore, when an electric potential difference is given between the electrodes 323 on the stator and the electrodes 333 on the mover, portions where the electrode plane on the electrodes 323 on the stator and the electrode plane on the electrodes 333 on the mover face each other serve as flat panel capacitors. Therefore, electrostatic suction force can be generated between the respective electrodes.

The electrostatic suction driving apparatus 310 further includes a control part (not shown) having a CPU as a main component. The control part generates a plurality of voltage signals (see FIG. 6) which are output from a signal source (not shown).

Furthermore, as shown in FIG. 22, the mover 330 is connected to a charge eliminating cable 350 formed of a flexible cable having good flexibility or the like, and the mover 330 is adapted to be movable. An end 351 on one of surfaces of the charge eliminating cable 350 is electrically connected to the surface of the mover 330. If the mover 330 is formed of material having a low resistance, an end 352 on the other side of the charge eliminating cable 350 is directly connected to a collector terminal 360c of a transistor 360 (a switching means). If the mover 330 is formed of a conductor, the end 352 is directly connected to the collector terminal 360c through a predetermined amount of an external resistor R1, as indicated by dotted line of FIG. 22. Further, an emitter terminal 360e of the transistor 360 is grounded to a ground potential G, and a base terminal 360b is connected to a part of the signal source. The discharge signal S shown in FIG. 6 is also applied to the base terminal 360b.

Since the mover 330 is formed of the conductor or the material having a low resistance entirely, the charge eliminating cable 350 can be connected to a predetermined location of the mover 330. That is, the charge eliminating cable 350 constituting the charge eliminating means can be freely connected to a predetermined location on the surface of the mover 330 capable of being movable, whereby it does not restrict the movement of the mover 330. In addition, the assembly of the entire apparatus can also be improved, since the degree of freedom of connection to the charge eliminating cable 350 can increase.

The operation of the electrostatic suction driving apparatus will now be described.

FIG. 24 is a plan view partially illustrating arrangement in the electrodes on the stator and the electrodes on the mover. One column of electrodes 333 on the mover is arranged between electrodes 323 on the stator that are mounted on two columns in an opposite moving direction (a Y direction). A timing chart, which shows an example of a voltage signal applied to each of electrode groups shown in FIG. 24, is the same as that shown in FIG. 6. Hereinafter, it is assumed that a Y2 side shown in the facing surface 330a of the mover 330 is a first row, and the electrodes 333 on the mover that are sequentially mounted on the Y1 direction are given by reference numerals of 333A, 333B, 333C, 333D, 333E, . . . , respectively.

As shown in FIG. 24, an E phase electrode group is formed at a first column of the left end on a facing surface 320a of a stator 320, and an A phase electrode group is formed at a second row thereof. Hereinafter, in a similar manner, a B phase electrode group is formed at a third row, a C phase electrode group is formed at a fourth row, a D phase electrode group is formed at a fifth row, and an E phase electrode group is formed at a sixth row. As described above, the electrode groups are disposed in a sequential manner.

In this case, the voltage signal as shown in FIG. 6 is applied to each of the electrode groups of the A phase to E phase. That is, in STEP 1, a voltage of a high level is applied to the A phase electrode group and the D phase electrode group at the same timing. In STEP 2, a voltage of a high level is applied to the B phase electrode group and the D phase electrode group at the same timing. In STEP 3, a voltage of a high level is applied to the B phase electrode group and the E phase electrode group at the same timing. In STEP 4, a voltage of a high level is applied to the C phase electrode group and the E phase electrode group at the same timing. In STEP 4, a voltage of a high level is applied to the A phase electrode group and the C phase electrode group at the same timing. STEPs are sequentially repeated in order of STEP 1, STEP 2, STEP 3, STEP 4, STEP 5, STEP 1, STEP 2, . . . .

An initial state of the electrostatic suction driving apparatus 10 is set as a state as shown in FIG. 24. In other words, the electrodes 333 on the mover A (the first row), 333C (the third row) and 333E (the fifth row) face each other in a state where they are partially overlapped between the E phase electrode group and the A phase electrode group, and the electrodes 333 on the mover B (the second row) and 333D (the fourth row) face only the C phase electrode group.

In this state, if a predetermined voltage is applied to the A phase electrode group and the D phase electrode group at the same time as a pre-stage of STEP 1, a static charge 10 Q is generated in the A phase electrode group on one side, and a negative charge −Q is induced in the electrodes 333 on the mover A on the other side because the A phase electrode group of the second row and the electrodes 333 on the mover A of the first row face each other in a state where they are partially overlapped. Accordingly, as electrostatic suction force (Coulomb force) acts between the A phase electrode group and the electrodes 333 on the mover A, the electrodes 333 on the mover A are sucked toward the electrodes 323 on the stator that form the A phase electrode group. However, since the electrodes 323 on the stator and 323 forming the A phase electrode group are disposed at opposite ends of the electrodes 333 on the mover A in the width direction, component acting in the width (X) direction of electrostatic suction force are offset. Meanwhile, electrostatic suction force of the Y1 direction acts on the electrodes 333 on the mover A, since component in the moving (Y) direction of the electrostatic suction force remain.

In this case, as a state where the center of the electrodes 333 on the mover A in the moving direction coincides with the center of the electrodes 323 on the stator forming the A phase electrode group in the moving direction is the most stable state, the electrodes 333 on the mover A move up to a location indicated by dotted line of FIG. 24. This is true of other electrodes 333 on the mover C and 333E. Therefore, the mover 330 is moved in the Y1 direction by combined force of the moving direction, which acts on electrostatic suction force of the electrodes 333 on the mover A, 333C and 333E.

In addition, in STEP 1, since a voltage is not applied to the C phase electrode group facing the electrodes 333 on the mover B and 333D, electrostatic suction force (Coulomb force) does not acts between the electrodes 333 on the mover B and 333D, and the C phase electrode group.

Next, at the rear stage of STEP 1, the discharge signal S is output from the signal source, and is then applied to the base terminal 360b of the transistor 360. Thus, as an ON state is set between the collector terminal 360c and the emitter terminal 360e in the transistor 360, a negative charge −Q, which is induced in the electrodes 333 on the mover A, 333C and 333E and is then accumulated on the mover 330, can be discharged toward a ground potential GI through the charge eliminating cable 350 and the transistor 360. As described above, since a charge state of the mover 330 can be cancelled, it is possible to prevent the moving speed or the response speed of the mover 330 from lowering.

In this case, time needed for discharge is determined based on a time constant RC between combined capacitance C between the electrodes 323 on the stator and the electrodes 333 on the mover, and a resistance value R that limits the current flowing through the charge eliminating cable 350. In case that the mover 330 is formed of material having a low resistance as described above, the time can be determined based on a resistance value R of the mover 330. Further, if the resistance value R of the mover 330 is low, the time constant RC can be freely set by additionally adding an external resistor.

Furthermore, in case that the mover 330 is formed of a conductor, the time constant RC can be determined based on an external resistor R1. Therefore, the time needed for discharge can be determined based on combined capacitance C and the resistance value R of the mover 330 or the time constant with the external resistor R1. That is, the mover 330, the charge eliminating cable 350, the transistor 360, and the external resistor R1 serve as charge eliminating means for discharging charge accumulated on the mover 330.

As described above, In case that the mover 330 is formed of the material having a low resistance, the charge eliminating means can be facilitated and the number of components can be significantly reduced.

In the same manner below, as voltage signals are sequentially applied to the electrode groups in order from STEP 1 to STEP 5 in the timing chart shown in FIG. 6, the mover 330 can move in the Y1 direction. In this case, the mover 330 can be discharged by a discharge signal applied at that time.

Further, if a series of operations are performed in an opposite order to the above, e.g., in order of STEP 5, STEP 4, STEP 3, STEP 2, STEP 1, and STEP 5, . . . , the mover 330 can be sequentially moved in an opposite direction (the Y2 direction) to the direction (the Y1 direction), while discharging the mover 330.

In addition, as shown in FIG. 24, assuming that the length of the electrodes 323 on the stator is L1a, an electrode gap of the electrodes 323 on the stator in the moving direction, which are adjacent to each other, is L1b, the length of the electrodes 333 on the mover is L2a, and an electrode gap of the electrodes 333 on the mover in the moving direction, which are adjacent to each other, is L2b, and the voltage signals accompanied by STEP 1 to STEP 5 of FIG. 6 are applied to the electrode groups of each phase of the electrodes 323 on the stator, the mover 330 can move in the Y1 direction by a distance (L2a+L2b) corresponding to one section of the mover-side electrodes 330 that are mounted on the moving direction.

In the present embodiment, it has been described that the discharge signal is applied in each STEP. The invention is, however, not limited thereto. For example, the discharge signal can be output only in any one of STEPs, e.g., STEP 1, or as in STEP 2 and STEP, the discharge signal can be output in a predetermined STEP. If the discharge signal is output at any timing, the moving speed or the response speed of the mover 330 can be prevented from lowering.

In the present embodiment, a pair of the relatively short side portions 323b and 323b on the electrodes 323 on the stator are formed to have a curved surface protruding in the moving direction. In the same manner, a pair of the relatively short side portions 333b and 333b on the electrodes 333 on the mover are formed to have a curved surface protruding in the moving direction. Therefore, it is possible to prevent abrupt charge in electrostatic suction force.

That is, In case that an angular portion (edge) of the electrodes 323 on the stator or the electrodes 333 on the mover is formed to have a sharp shape, electrostatic suction force can change abruptly due to inverse proportion to the square of a distance between the electrodes, and easy concentration of electrostatic suction force on the angular portion.

Accordingly, if at least one of the short side portion 323b of the electrodes 323 on the stator and the short side portion 333b of the electrodes 333 on the mover is formed to have a curved surface into a convex shape, more particularly, a surface of a circular arc shape, abrupt change in electrostatic suction force can be prevented. It is thus possible to drive the mover 330 at a constant speed (smooth driving).

In addition, in the present embodiment, it has been described that the stator includes a plurality of the electrode groups, the voltage signal is applied to the electrode groups, and the mover is discharged. The invention, however, is not limited to the above embodiment. Instead, the electrode groups can be formed on the mover and the voltage signal is then applied thereto, and the stator can also be discharged.

It also has been described that the electrode groups of the A phase to the E phase are formed, and the voltage signals of 5 phases are applied to the respective electrode groups. The invention, however, is not limited thereto, but the electrode groups and the phase of the voltage signal can be lower than those of the embodiment (more than 2 phases), or higher than those of the embodiment.

The transistor 360 also has been descried as the switching means. However, the switching means can include semiconductor devices such as FET, switches, relays, and the like.

According to the invention, since great electrostatic suction force can be obtained, an electrostatic suction driving apparatus capable of generating great driving force can be provided. It is thus possible to transport heavier load compared to the prior art.

Furthermore, since a mover can be discharged at a predetermined timing, it is possible to prevent the moving speed or the response speed of the mover from lowering.

Furthermore, in the electrostatic suction driving apparatus of the invention, frictional resistance between a stator and a mover is reduced. It is thus possible to move the mover in a stable manner.

Furthermore, since the efficiency of electrostatic suction force can be improved, driving efficiency of the electrostatic suction driving apparatus can be enhanced.

Furthermore, in the invention, the mover can be easily discharged by a simple construction. It is thus possible to prevent the moving speed or the response speed of the mover from lowering. Moreover, since a cable for discharge can be connected to a predetermined location of the mover, the degree of freedom of connection can be increased. Thus, the assembly of the entire apparatus can be improved.

The smooth driving property of the mover can also be increased.

What is claimed is:

1. An electrostatic attraction driving apparatus, comprising:
   a stator disposed to extend in a moving direction;
   a mover facing the stator;
   stator-side electrodes protruding from a facing surface on the stator facing the mover perpendicularly to a direction of the mover and at the same time aligned along the moving direction, and
   mover-side electrodes provided on the mover and protruding from a facing surface on the mover facing the facing surface on the stator perpendicularly to a direction of the stator and at the same time aligned along the moving direction, wherein the stator-side electrodes and the mover-side electrodes are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes on the stator and the mover-side electrodes are disposed so as to face each other, and wherein a plurality of the electrodes on the stator is disposed on the facing surface on the stator at predetermined intervals in the moving direction and in the width direction in a regular manner, and a plurality of the mover-side electrodes is disposed on the facing surface on the mover at locations where the mover-side electrodes do not overlap with the electrodes on the stator in a regular manner.

2. The electrostatic attraction driving apparatus according to claim 1, wherein the mover is grounded through a predetermined resistor.

3. The electrostatic attraction driving apparatus according to claim 2, wherein an electrical connection state between the mover and a ground potential is switched at a predetermined timing.

4. An electrostatic attraction driving apparatus, comprising:

a stator disposed to extend in a moving direction;

a mover facing the stator;

stator-side electrodes protruding from a facing surface on the stator facing the mover perpendicularly to a direction of the mover and at the same time aligned along the moving direction, and mover-side electrodes provided on the mover and protruding from a facing surface on the mover facing the facing surface on the stator perpendicularly to a direction of the stator and at the same time aligned along the moving direction, wherein the stator-side electrodes and the mover-side electrodes are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes an the stator and the mover-side electrodes are disposed so as to face each other, and wherein a plurality of electrode groups formed by electrically connecting a plurality of the electrodes on the stator aligned in the width direction are aligned parallel to each other in to moving direction with the electrode groups spaced apart, and the mover is driven as electrical signals having two or more phases are applied to the respective electrode groups.

5. An electrostatic attraction driving apparatus, comprising:

a stator provided with stator-side electrodes, and a mover provided with mover-side electrodes and moving in a moving direction while facing the stator, wherein the mover is moved by electrostatic attraction force generated at portions where the electrodes on the stator and the mover-side electrodes are disposed so as to face each other, a guiding means for guiding the mover in the moving direction is disposed between the stator and the mover, and wherein the guiding means is defined with guide grooves provided in the form of a straight line on a facing surface on one of the stator and the mover along the moving direction and sliding convex parts disposed on a facing surface on the other one of the stator and the mover and freely moving along the moving direction with the sliding convex parts inserted into the guide grooves respectively.

6. The electrostatic attraction driving apparatus according to claim 5, wherein the grooves are formed with V-shaped grooves or trapezoid grooves having a first inclined plane and a second inclined plane formed so as to face the first inclined plane at a predetermined included angle.

7. An electrostatic attraction driving apparatus, comprising:

a stator provided with stator-side electrodes, and a mover provided with mover-side electrodes and moving in a moving direction while facing the stator, wherein the mover is moved by electrostatic attraction force generated at portions where the electrodes on the stator and the mover-side electrodes are disposed so as to face each other, a guiding means for guiding the mover in the moving direction is disposed between the stator and the mover, and wherein the guiding means is defined with rolling bodies disposed rollably on the facing surface on one of the stator and the mover and guide grooves provided in the font of straight line on the facing surface on the other one of the stator and the mover to guide the rolling direction of the rolling bodies towards the moving direction.

8. The electrostatic attraction driving apparatus according to claim 7, wherein retaining grooves extending so as to face the guide grooves are formed on the facing surface on one of the stator and the mover.

9. The electrostatic attraction driving apparatus according to claim 7, wherein the grooves are formed with V-shaped grooves or trapezoid grooves having a first inclined plane, and a second inclined plane formed so as to face the first inclined plane at a predetermined included angle.

10. The electrostatic attraction driving apparatus according to claim 7, wherein the rolling bodies are formed with spherical bodies or cylindrical bodies.

11. The electrostatic attraction driving apparatus according to claim 7, wherein a first cylindrical body and a second cylindrical body as the rolling bodies are provided, and a rotating axis of the first cylindrical body and a rotating axis of the second cylindrical body are inclined with a direction of the rotating axis of the first cylindrical body maintained different from a direction of the rotating axis of the second cylindrical body.

12. The electrostatic attraction driving apparatus according to claim 7, wherein retaining grooves extended so as to face the guide grooves are formed on the facing surface on one of the stator and the mover, and spherical bodies are disposed rollably between the guide grooves and the retaining grooves.

13. The electrostatic attraction driving apparatus according to claim 12, wherein wall portions extended along the moving direction are formed at facing surfaces near the retaining grooves.

14. The electrostatic attraction driving apparatus according to claim 12, further comprising:
a guide groove on the stator having its surface covered with a conductive film;
a retaining groove having its surface covered with a conductive film on the mover;
a conductive spherical body for rolling freely between the guide groove and the retaining groove;
a resistor connected to the conductive film on the stator; and
a charge eliminating means having a switch element to switch the resistor and a ground from a conductive state to a non-conductive state or from a non-conductive state to a conductive state in response to a predetermined signal.

15. The electrostatic attraction driving apparatus according to claim 7, wherein retaining holes in the form of square are formed on the facing surface on one of the stator and the mover, and the spherical bodies are disposed rollably in the retaining holes.

16. The electrostatic attraction driving apparatus according to claim 7, wherein a substantially O-shaped circulating groove for connecting a pair of parallel grooves having respective depths different from each other to be extended parallel to each other along the moving direction to opposite ends of the parallel grooves, and plurality of spherical bodies for freely moving in the circulating groove are formed on the facing surface on the mover, guide grooves disposed so as to face a groove having a relatively shallow depth among a pair of the parallel grooves are formed in the stator along the moving direction.

17. An electrostatic attraction driving apparatus which includes a stator provided with stator-side electrodes, a mover provided with mover-side electrodes and supported movably in a moving direction with the mover facing the stator, and a signal source for applying a predetermined voltage signal to the electrodes on the stator, the mover being moved by electrostatic attraction force generated at portions where the electrodes on the stator and the mover-side electrodes are disposed so as to face each other,
wherein the mover is formed with a conductor or material having a low resistance, and
wherein the mover-side electrodes and the electrodes on the stator are protruding vertically from the facing surface on one of the stator and the mover towards the facing surface on the other one of the stator and the mover, at the same time are provided with a pair of relatively long side portions parallel to the moving direction and a relatively short side portions provided at opposite ends in the moving direction, and are formed with a curved surface that is convex in the moving direction.

18. The electrostatic attraction driving apparatus according to claim 17, wherein the mover is formed with silicon having a low resistance.

19. The electrostatic attraction driving apparatus according to claim 17, wherein the mover-side electrodes and all over the mover are formed of resin having material with a low resistance mixed with a conductive resin.

20. The electrostatic attraction driving apparatus according to claim 17, wherein a resistance value in the mover ranges from 1 Ω to 1 kΩ.

21. The electrostatic attraction driving apparatus according to claim 17, wherein a charge eliminating means is disposed between the mover and a ground potential.

22. An electrostatic attraction driving apparatus, comprising:
a stator disposed to extend in a moving direction,
a mover disposed so as to face the stator,
stator-side electrodes protruding from a facing surface on the stator disposed so as to perpendicularly face the mover in a direction of the mover and be aligned along the moving direction, and
mover-side electrodes provided on the mover and protruding from a facing surface on the mover facing the facing surface on the stator perpendicularly to a direction of the stator and at the same time aligned along the moving direction,
wherein the stator-side electrodes and the mover-side electrodes are disposed are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes on the stator and the mover-side electrodes are disposed so as to face each other,
wherein a guiding means for guiding the mover into moving direction is disposed between the stator and the mover, and
wherein the guiding means is defined with guide grooves provided in the form of a straight line on a facing surface on one of the stator and the mover along the moving direction and sliding convex parts disposed on a facing surface on the other one of the stator and the mover and freely moving along the moving direction with the sliding convex parts inserted into the guide grooves respectively.

23. The electrostatic attraction driving apparatus according to claim 22, wherein the grooves are formed with V-shaped grooves or trapezoid grooves having a first inclined plane and a second inclined plane formed so as to face the first inclined plane at a predetermined included angle.

24. An electrostatic attraction driving apparatus, comprising:
a stator disposed to extend in a moving direction,
a mover disposed so as to face the stator,
stator-side electrodes protruding from a facing surface on the stator disposed so as to perpendicularly face the mover in a direction of the mover and be aligned along the moving direction, and
mover-side electrodes provided on the mover and protruding from a facing surface on the mover facing the facing surface on the stator perpendicularly to a direction of the stator and at the same time aligned along the moving direction.
wherein the stator-side electrodes and the mover-side electrodes are disposed are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes on the stator and the mover-side electrodes are disposed so as to face each other,
wherein a guiding means for guiding the mover in the moving direction is disposed between the stator and the mover, and wherein the guiding means is defined with rolling bodies disposed rollably on the facing surface on one of the stator and the mover and guide grooves provided in the form of straight line on the facing surface on the other one of the stator and the mover to guide the rolling direction of the rolling bodies towards the moving direction.

25. The electrostatic attraction driving apparatus according to claim 24, wherein retaining grooves extending so as to face the guide grooves are formed on the facing surface on one of the stator and the mover.

26. The electrostatic attraction driving apparatus according to claim 24, wherein the grooves are formed with V-shaped grooves or trapezoid grooves having a first inclined plane and a second inclined plane formed so as to face the first inclined plane at a predetermined included angle.

27. The electrostatic attraction driving apparatus according to claim 24, wherein the rolling bodies are formed with spherical bodies or cylindrical bodies.

28. The electrostatic attraction driving apparatus according to claim 24, wherein a first cylindrical body and a second cylindrical body as the rolling bodies are provided, and a rotating axis of the first cylindrical body and a rotating axis of the second cylindrical body are inclined with a direction of the rotating axis of the first cylindrical body maintained different from a direction of the rotating axis of the second cylindrical body.

29. The electrostatic attraction driving apparatus according to claim 28, further comprising:
 a guide groove on the stator having its surface covered with a conductive film;
 a retaining groove having its surface covered with a conductive film on the mover;
 a conductive spherical body for rolling freely between the guide groove and the retaining groove;
 a resistor connected to the conductive film on the stator; and
 a charge eliminating means having a switch element to switch the resistor and a ground from a conductive stale to a non-conductive state or from a nonconductive state to a conductive state in response to a predetermined signal.

30. The electrostatic attraction driving apparatus according to claim 24, wherein retaining grooves extended so as to face the guide grooves are formed on the facing surface on one of to stator and the mover, and spherical bodies are disposed rollably between the guide grooves and the retaining grooves.

31. The electrostatic attraction driving apparatus according to claim 30, wherein wall portions extended along the moving direction are formed at facing surfaces near the retaining grooves.

32. The electrostatic attraction driving apparatus according to claim 24, wherein retaining holes in the form of square are formed on the facing surface on one of the stator and the mover, and the spherical bodies are disposed rollably in the retaining holes.

33. The electrostatic attraction driving apparatus according to claim 24, wherein a substantially O-shaped circulating groove for connecting a pair of parallel grooves having respective depths different from each other to be extended parallel to each other along the moving direction to opposite ends of the parallel grooves, and a plurality of spherical bodies for freely moving in the circulating groove are formed on the facing surface on the mover, guide grooves disposed so as to face a groove having a relatively shallow depth among a pair of the parallel grooves are formed in the stator along the moving direction.

34. An electrostatic attraction driving apparatus, comprising:
 a stator disposed to extend in a moving direction,
 a mover disposed so as to face the stator,
 stator-side electrodes protruding from a facing surface on the stator disposed so as to perpendicularly face the mover in a direction of the mover and be aligned along the moving direction, and
 mover-side electrodes provided on the mover and protruding from a facing surface on the mover facing to facing surface on the stator perpendicularly to a direction of the stator and at the same time aligned along the moving direction,
 wherein the stator-side electrodes and the mover-side electrodes are disposed are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes on the stator and the mover-side electrodes are disposed so as to face each other,
 wherein a guiding means for guiding the mover in the moving direction is disposed between the stator and the mover, and
 wherein a plurality of the electrodes on the stator is disposed on the facing surface on the stator at predetermined intervals in the moving direction and in the width direction in a regular manner, and a plurality of the mover-side electrodes is disposed on the facing surface on the mover at locations where the mover-side electrodes do not overlap with the electrodes on the stator in a regular manner.

35. An electrostatic attraction driving apparatus, comprising:
 a stator disposed to extend in a moving direction,
 a mover disposed so as to face the stator,
 stator-side electrodes protruding from a facing surface on the stator disposed so as to perpendicularly face the mover in a direction of the mover and be aligned along the moving direction, and
 mover-side electrodes provided on the mover and protruding from a facing surface on the mover facing the facing surface on the stator perpendicularly to a direction of the stator and at the same dine aligned along the moving direction,
 wherein the stator-side electrodes and the mover-side electrodes are disposed are disposed facing each other in a width direction which is perpendicular to the moving direction and also perpendicular to a direction in which the facing surface on the stator faces the facing surface on the mover, and the mover is moved in the moving direction by electrostatic attraction force generated at portions where the electrodes on the stator and the mover-side electrodes are disposed so as to face each other,
 wherein a guiding means for guiding the mover in the moving direction is disposed between the stator and the mover, and
 wherein a plurality of electrode groups formed by electrically connecting a plurality of the electrodes on the stator aligned in the width direction are aligned parallel to each other in the moving direction with the electrode groups spaced apart, and the mover is driven as electrical signals having two or more phases are applied to the respective electrode groups.

* * * * *